US009997265B2

(12) United States Patent
Remley et al.

(10) Patent No.: US 9,997,265 B2
(45) Date of Patent: Jun. 12, 2018

(54) SAFETY SYSTEM FOR A NUCLEAR POWER PLANT AND METHOD FOR OPERATING THE SAME

(71) Applicant: Mitsubishi Electric Power Products, Inc., Warrendale, PA (US)

(72) Inventors: Gilbert William Remley, Warrendale, PA (US); Kenneth Scarola, Warrendale, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 593 days.

(21) Appl. No.: 14/671,172

(22) Filed: Mar. 27, 2015

(65) Prior Publication Data

US 2016/0284429 A1 Sep. 29, 2016

(51) Int. Cl.
| | |
|---|---|
| *G21D 3/00* | (2006.01) |
| *G21D 3/06* | (2006.01) |
| *G21C 7/36* | (2006.01) |
| *G21C 17/10* | (2006.01) |

(52) U.S. Cl.
CPC ............ *G21D 3/06* (2013.01); *G21C 7/36* (2013.01); *G21D 3/001* (2013.01); *G21C 17/10* (2013.01); *Y02E 30/39* (2013.01)

(58) Field of Classification Search
CPC ............ G21D 3/001; G21D 3/04; G21C 7/36
See application file for complete search history.

(56) References Cited

U.S. PATENT DOCUMENTS

| | | | |
|---|---|---|---|
| 4,843,537 A | 6/1989 | Arita et al. | |
| 5,291,190 A | 3/1994 | Scarola et al. | |
| 5,586,156 A * | 12/1996 | Gaubatz ................. | G21C 17/00 |
| | | | 376/216 |

(Continued)

FOREIGN PATENT DOCUMENTS

WO 99/44205 A1 9/1999

OTHER PUBLICATIONS

International Search Report and Written Opinion of the International Searching Authority dated Jul. 28, 2016 issued in corresponding International Patent Application No. PCT/US2016/023933.

(Continued)

*Primary Examiner* — Sharon M Davis
(74) *Attorney, Agent, or Firm* — Posz Law Group, PLC

(57) ABSTRACT

A safety system for a nuclear power plant includes first through fourth sensors; a first division, including a first calculation module that determines first and second calculation results based on signals from the first and second sensors, a first data-sharing module for sharing the first and second calculation results with a second division, and a first voting logic for generating a first safety demand signal based on the first through fourth calculation results; and the second division, including a second calculation module for determining the third and fourth calculation results based on signals from the third and fourth sensors, a second data-sharing module for sharing the third and fourth calculation results with the first division, and a second voting logic for generating a second safety demand signal based on the first, second, third, and fourth calculation results, wherein the first through fourth sensors each monitor the same plant parameters.

17 Claims, 15 Drawing Sheets

(56) References Cited

U.S. PATENT DOCUMENTS

| | | | |
|---|---|---|---|
| 6,532,550 B1 * | 3/2003 | Crew | G05B 9/03 |
| | | | 714/11 |
| 7,130,703 B2 | 10/2006 | Ott et al. | |
| 2003/0212498 A1 | 11/2003 | Kramb et al. | |
| 2013/0315362 A1 | 11/2013 | Ou | |

OTHER PUBLICATIONS

International Preliminary Report on Patentability of the International Searching Authority dated Oct. 12, 2017 issued in corresponding International Patent Application No. PCT/US2016/023933.

* cited by examiner

SAFETY SYSTEM FOR A NUCLEAR POWER PLANT AND METHOD FOR OPERATING THE SAME

FIELD OF THE INVENTION

The present invention relates generally to control systems for nuclear power generators. More particularly, the present invention relates to a safety system for a nuclear power plant and a related method for controlling such a safety system that meets conventional safety requirements and saves plant capital and operations and maintenance costs.

BACKGROUND OF THE INVENTION

In order to meet world-wide nuclear power plant safety requirements, a nuclear power plant safety system must meet a requirement that is commonly referred to as the "single failure criterion" (SFC). This means that the safety system must be able to withstand any single failure and still perform its safety function. This requirement leads to safety system designs that include redundant parts each capable of performing the required safety function. The redundant parts are commonly referred to as safety divisions.

Nuclear power plant safety systems typically provide two types of protective actions: (1) drop the neutron absorbing control rods into the reactor to stop the nuclear chain reaction, known as a "reactor trip" (RT); or (2) start pumps and control valves to keep the reactor cool and guard against radiation release to the surrounding atmosphere, known as "engineered safety features" (ESF) actuation. There are typically multiple ESF functions (e.g., core cooling, containment isolation, air filtration) for a nuclear reactor, any or all of which can be activated during ESF actuation.

A safety system configuration that includes two safety divisions, either of which can perform the safety functions, meets the single failure criterion requirement. This type of redundant configuration is referred to as a one-out-of-two (1oo2) configuration.

However, with a 1oo2 configuration, there is a concern that a single failure in either one of the two safety divisions can cause an unneeded automatic protective action that will shut down the plant due to erroneous actuation of RT or ESF safety functions, and thereby adversely affect normal nuclear power plant operation. To address this concern, additional safety divisions have been added in prior safety system designs. In these configurations, there are at least three redundant safety divisions, and at least two-out-of-three (2oo3) of the redundant safety divisions need to initiate their protective action safety demands before an automatic RT or ESF protective action is initiated.

While three divisions resolve the erroneous action concern, the majority of nuclear safety systems have four divisions to allow one division to be taken out of service for periodic testing, and to allow for equipment failure. Testing or failures can result in an actuated state for the affected division, placing the system in a 1-out-of-3 configuration for the remaining three divisions, which makes the system susceptible to spurious actuation that could cause an erroneous plant shutdown. Taking the fourth division out of service for testing or failures allows the system to return to a 2-out-of-3 configuration. The majority of prior systems are analog systems that are under test for a significant period of time to meet reliability requirements.

In addition to requiring 2ooN divisions to confirm a need for safety action, current safety systems employ two levels of 2ooN voting to reliably actuate RT or ESF protective actions, while providing additional tolerance to prevent plant disturbances due to spurious actions.

In most current safety systems, calculation results data for the same process measurement channels are shared among the three or four safety divisions using isolated data communications so that like trip function results (typically referred to as partial trip signals) can be voted within each division before that division initiates its own protective action safety demands. This is referred to as specific coincidence voting, as opposed to general coincidence voting.

With general coincidence voting, one division may initiate its protective action safety demand based on a channel that measures temperature, and a second division may initiate its protective action safety demand based on a channel that measures pressure. For this condition, an unneeded reactor shutdown will be initiated erroneously based on the 2-out-of-N (2ooN) division protective action logic.

Specific coincidence voting prevents this erroneous protective action, by ensuring that each division initiates its own protective action, only when 2ooN divisions calculate the need for protective action based on the same process measurement (e.g., temperature).

Therefore, most current nuclear safety systems employ two levels of voting: level 1 and level 2. Level 1 voting is specific coincidence voting for like measurement channels within each division; and Level 2 voting is general coincidence voting based on the protective action safety demand (e.g., RT or a specific ESF function) of each division.

Current plants have only two ESF divisions; plants that have been newly licensed but not yet constructed have as many as four ESF divisions. Regardless of the number of divisions, in most modern plants, each division is actuated through level 2 voting that is based on 2ooN (most typically 2oo4) signals from level 1. This 2oo4 design meets the single failure criterion while preventing spurious actuation caused by a level 1 single failure or test. But this 2oo4 level 2 voting requires additional isolated data communications to receive the level 1 signals from the four safety divisions, which adds additional design complexity and cost.

Thus, the nuclear industry has migrated to four division safety systems with 2oo4 voting at level 1 and level 2 to achieve single failure criterion compliance, spurious actuation prevention, and testing/failure tolerance. While this is a robust solution, installing and maintaining four safety divisions with two levels of multi-division voting is costly. It would therefore be desirable to achieve these same critical performance demands using only two safety divisions.

SUMMARY

A safety system for a nuclear power plant is provided, comprising: a first set of safety sensors including a first plurality of sensors providing a first plurality of sensor signals, respectively; a second set of safety sensors including a second plurality of sensors providing a second plurality of sensor signals, respectively; a third set of safety sensors including a third plurality of sensors providing a third plurality of sensor signals, respectively; a fourth set of safety sensors including a fourth plurality of sensors providing a fourth plurality of sensor signals, respectively; a first division, including a first calculation module configured to determine first and second calculation results based on the first and second pluralities of sensor signals, a first data-sharing module configured to share the first and second calculation results with a second division, and a first enhanced voting logic configured to generate a first safety demand signal based on the first and second calculation results and third and fourth calculation results; and the second division, including a second calculation module configured to determine the third and fourth calculation results based on the third and fourth pluralities of sensor signals, a second data-sharing module configured to share the third and fourth calculation results with the first division, and a second enhanced voting logic configured to generate a second safety demand signal based on the first, second, third, and fourth calculation results, wherein the first, second, third, and fourth pluralities of sensors each monitor the same plant parameters.

The safety system may further comprise an optical communication system connected between the first and second data-sharing modules, the optical communication system configured to pass the first and second calculation results to the second division, and to pass the third and fourth calculation results to the first division.

The first, second, third, and fourth calculation results may each indicate whether a particular safety-related action should be taken in the nuclear power plant.

The first enhanced voting logic may be further configured to generate the first safety demand signal by using two-out-of-four voting with respect to the first, second, third, and fourth calculation result signals.

The second enhanced voting logic may be further configured to generate the second safety demand signal by using two-out-of-four voting with respect to the first, second, third, and fourth calculation result signals.

The first enhanced voting logic may be further configured to generate the first safety demand signal by using A-out-of-B voting with respect to the first, second, third, and fourth data signals, where B is a total number of available signals from among the first, second, third, and fourth calculation result signals, and where A is an integer equal to or lower than B.

The second enhanced voting logic may be further configured to generate the second safety demand signal by using C-out-of-D voting with respect to the first, second, third, and fourth data signals, where D is a total number of available signals from among the first, second, third, and fourth data signals, and where C is an integer equal to or lower than D.

The first enhanced voting logic may be further configured such that it can be set to generate the first safety demand signal by using one-out-of-two voting between a first result of one-out-of-one voting based on one of the first or second calculation results and a second result based on two-out-of-three voting with respect to three of the first, second, third, and fourth calculation results.

The first enhanced voting logic may be further configured such that it can be set to generate the first safety demand signal by using one-out-of-two voting between a first result of one-out-of-one voting based on one of the first and second calculation results and a second result based on two-out-of-two voting with respect to two of the first, second, third, and fourth calculation results.

A method of generating a safety demand signal for a nuclear power plant is provided, the method including receiving a plurality of first and second sensor signals at a first division; receiving a plurality of third and fourth sensor signals at a second division; generating first and second data signals based on the first and second sensor signals; generating third and fourth data signals based on the third and fourth sensor signals; sending the first and second data signals from the first division to the second division; sending the third and fourth data signals from the second division to the first division; determining that either one of the first, second, third, or fourth sensor signals is erroneous, or that the receiving of the third and fourth data signals is erroneous; entering a limiting condition of operation; changing voting logic in the first division based on the determining that either one of the first, second, third, or fourth sensor signals is erroneous, or the sending of the third and fourth data signals is erroneous; generating a first safety demand based on the changed voting logic and at least two of the first, second, third, and fourth data signals; and ending the limiting condition of operation.

The sending of the first and second data signals and the sending of the third and fourth data signals may be performed using an optical communication system.

The first, second, third, and fourth data signals may each indicate whether a particular safety-related action should be taken in the nuclear power plant.

The changed voting logic may be two-out-of-three voting with respect to the first, second, third, and fourth data signals when there is a non-conservative signal failure.

The changed voting logic may be A-out-of-B voting with respect to the first, second, third, and fourth data signals, where B is a total number of available data signals from among the first, second, third, and fourth calculation result signals, and where A is an integer equal to or lower than B.

The method may further comprise generating a second safety demand based on at least two of the first, second, third, and fourth data signals; and generating a safety demand signal by using one-out-of-two voting based on the first and second safety demands.

The generating of the first safety demand signal may be performed by using one-out-of-two voting between a first result of one-out-of-one voting based on one of the first and second calculation result signals and a second result based on two-out-of-three voting with respect to three of the first, second, third, and fourth calculation result signals.

The generating of the first safety demand signal may be performed by using one-out-of-two voting between a first result of one-out-of-one voting based on one of the first and second calculation result signals and a second result of two-out-of-two voting with respect to two of the first, second, third, and fourth calculation result signals.

A component control device is provided, including a reactor protection processor including a first signal path configured to process a plurality of data signals to generate a first control signal, the first control signal having a first signal value, and a second signal path configured to process the plurality of data signals to generate a second control signal, the second control signal having a second signal value; and a first component control processor configured to set a first component control signal to an active value when the first signal value is a first set value and the second signal value is a second set value, and to set the first component control signal to an inactive value when either the first signal value is not the first set value or the second signal value is not the second set value.

The first set value may be a high value and the second set value may be a low value.

The first component control processor may include an inverter configured to invert the second control signal to generate an inverted second control signal having an inverted second signal value, and a two-out-of-two voting module configured to set the first component control signal to the active value when the first control signal and the inverted second control signal both have the high value.

The first set value may be a high value and the second set value may be the high value.

The first component control processor may include a two-out-of-two voting module configured to set the first component control signal to the active value when the first control signal and the second control signal both have the high value.

The first set value may be a low value and the second set value may be the low value.

The first component control processor may include a two-out-of-two voting module configured to set the first component control signal to the active value when the first control signal and the second control signal both have the low value.

The first path may include a first A-out-of-B voting module configured to generate a first intermediate signal having the first set value when A out of the plurality of incoming signals have the first set value, the second path may include a second A-out-of-B voting module configured to generate a second intermediate signal having the second set value when A out of the plurality of incoming signals have the first set value, where B is the number of the plurality of incoming signals, and where A is an integer less than B.

The first path may include an on-delay timer that receives the first intermediate signal and generates a first delayed signal, and the second path may include an off-delay timer that receives the second intermediate signal and generates a second delayed signal.

The first path may receive the second delayed signal, and the second path may receive the first delayed signal.

A method of generating a safety demand signal for a nuclear power plant is provided, the method including receiving a plurality of data signals; processing the plurality of data signals on a first path to generate a first control signal; processing the plurality of data signals on a second path to generate a second control signal; determining whether the first control signal has a first set value; determining whether the second control signal has a second set value; and setting the safety demand signal to an active level when the first control signal has the first set value and the second control signal has the second set value, and to an inactive level when either the first control signal does not have the first set value or the second control signal does not have the second set value.

The first set value may be a high value and the second set value may be a low value.

The setting of the safety demand signal may include setting the safety demand signal to the active value when the first control signal has the high value and the second control signal has the low value.

The setting of the safety demand signal may include inverting the second control signal to generate an inverted second control signal having an inverted second signal value.

The first set value may be a high value and the second set value may be the high value.

The setting of the safety demand signal may include setting the safety demand signal to the active value when the first control signal and the second control signal both have the high value.

The first set value may be a low value and the second set value may be the low value.

The setting of the safety demand signal may include setting the first component control signal to the active value when the first control signal and the second control signal both have the low value.

In the disclosed method, B may be the number of the plurality of incoming signals, A may be an integer less than B, the operation of processing the plurality of data signals on a first path may include generating a first intermediate signal having the first set value when A out of the plurality of B incoming signals have the first set value, and the operation of processing the plurality of data signals on a first path may include generating a second intermediate signal having the second set value when A out of the plurality of B incoming signals have the first set value.

The method may further comprise performing an on-delay on the first intermediate signal to generate a first delayed signal, and performing an off-delay on the second intermediate signal to generate a second delayed signal.

A safety system for a nuclear power plant is provided, including: a first dipole switch connected between a control power source and a first node, the first dipole switch being configured to be closed when a manual activation signal is at a first level, and open when the manual activation signal is at a second level; a second dipole switch connected between the first node and a second node; a third dipole switch connected between the first node and the second node; a fourth dipole switch connected between the first node and a third node; a fifth dipole switch connected between the third node and a fourth node; a sixth dipole switch connected between the first node and the fourth node, the sixth dipole switch being configured to be open when the manual activation signal is at a second level, and closed when the manual activation signal is at a first level; a seventh dipole switch connected between the second node and a fifth node; an undervoltage coil being located between the fifth node and ground, and being configured to actuate upon being de-energized; a shunt trip coil being located between the fourth node and ground, and being configured to actuate upon being energized; a first control circuit configured to instruct the second dipole switch to be closed when an undervoltage control signal indicates that a reactor trip is not needed, and to be open when the undervoltage control signal indicates that a reactor trip is needed; a second control circuit configured to instruct the third dipole switch to be closed when a diverse undervoltage control signal indicates that a reactor trip is not needed, and to be open when the diverse undervoltage control signal indicates that the reactor trip is needed; a third control circuit configured to instruct the fourth dipole switch to be open when a shunt trip control signal indicates that the reactor trip is not needed, and to be closed when the shunt trip control signal indicates that the reactor trip is needed; a fourth control circuit configured to instruct the fifth dipole switch to be open when a diverse shunt trip control signal indicates that the reactor trip is not needed, and to be closed when the diverse shunt trip control signal indicates that the reactor trip is needed; and a fifth control circuit configured to instruct the seventh dipole switch to be open when a first watchdog timer output indicates that the reactor trip is not needed, and to be closed when the first watchdog timer output indicates that the reactor trip is needed.

The first, second, third, and fourth control circuits may be energize-to-actuate circuits, which are de-energized during normal operation of the nuclear power plant, the fifth control circuit may be a de-energize-to-actuate circuit, which is energized during normal operation of the nuclear power plant, the undervoltage coil may be a de-energize-to-actuate element, which is energized during normal operation of the nuclear power plant, and the shunt trip coil may be an energize-to-actuate element, which is de-energized during normal operation of the nuclear power plant.

The safety system may further include an eighth dipole switch connected between a sixth node and a seventh node;

a pair of first fuses arranged in series between the second node and the sixth node; a pair of second fuses arranged in series between the fifth node and the seventh node; and a sixth control circuit configured to instruct the eighth dipole switch to be open when a second watchdog timer output indicates that the reactor trip is not needed, and to be closed when the second watchdog timer output indicates that the reactor trip is needed.

The sixth control circuit may be a de-energize-to-actuate circuit, which is energized during normal operation of the nuclear power plant.

The fifth control circuit may be located in a first safety division, and the sixth control circuit may be located in a second safety division.

A method of controlling a reactor trip is provided, including: de-energizing an undervoltage coil; energizing a shunt trip coil; determining if a manual activation signal indicates that the undervoltage coil should be de-energized or the shunt trip coil should be energized; performing an undervoltage check to determine if an undervoltage control signal and a diverse undervoltage control signal indicate that the undervoltage coil should be de-energized; performing a shunt trip check to determine if the a shunt trip control signal and a diverse shunt trip control signal indicate that the shunt trip coil should be energized; performing a watchdog timer check to determine if a pair of watchdog timer outputs indicate that the undervoltage coil should be de-energized; performing a reactor trip if the undervoltage coil has been de-energized or the shunt trip coil has been energized; and periodically repeating the operations of performing a manual check, performing an undervoltage check, performing a shunt trip check, performing a watchdog timer check, and performing a reactor trip.

The undervoltage control signal and the diverse undervoltage control signal may both indicate that the undervoltage coil should be de-energized by having a high value.

The undervoltage control signal may indicate that the undervoltage coil should be de-energized by having a high value, and the diverse undervoltage control signal may indicate that the undervoltage coil should be de-energized by having a low value.

The shunt trip control signal and the diverse shunt trip control signal may both indicate that the shunt trip coil should be energized by having a high value.

The shunt trip control signal may indicate that the shunt trip coil should be energized by having a high value, and the diverse shunt trip control signal may indicate that the shunt trip coil should be energized by having a low value.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
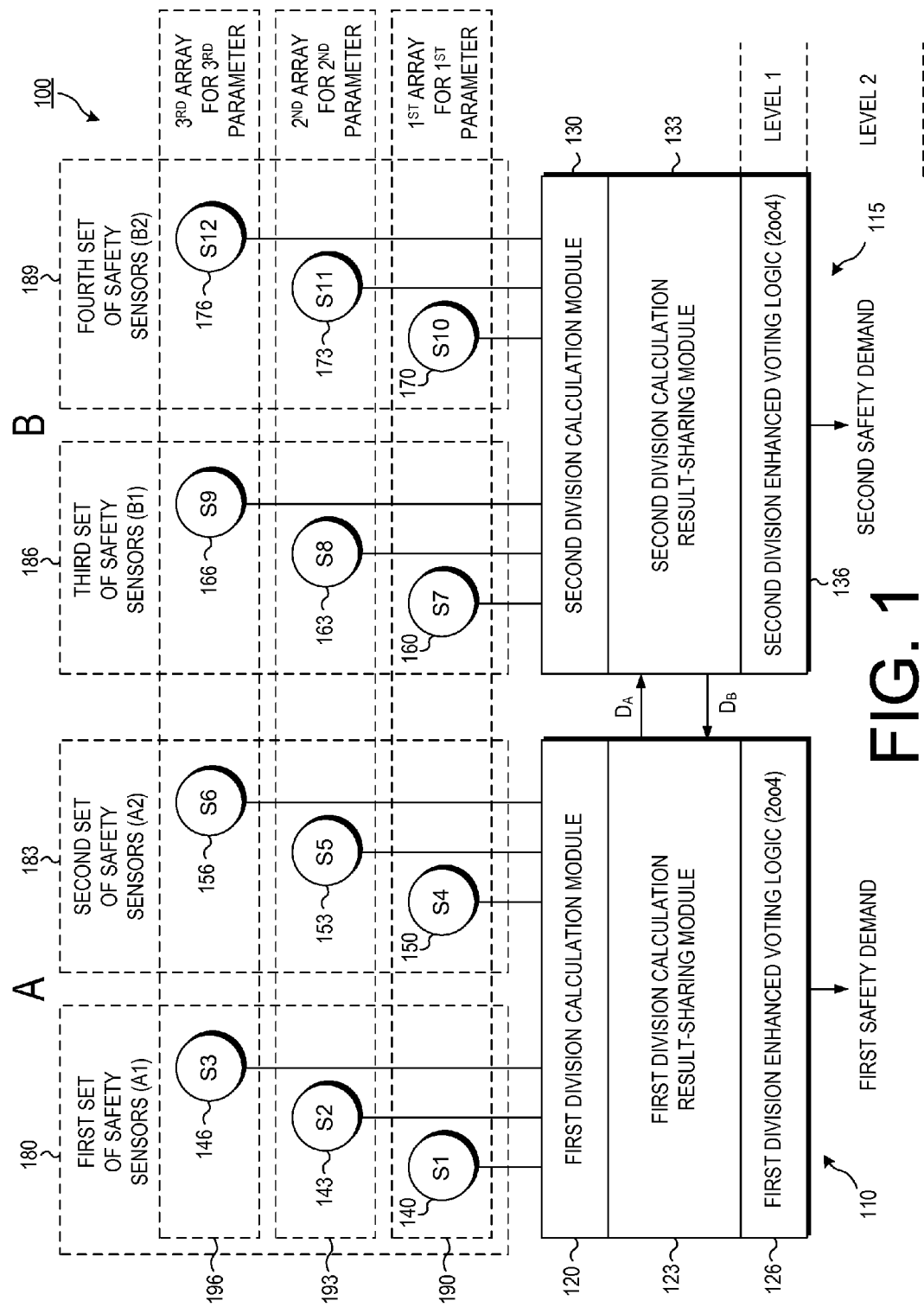
FIG. 1 is a block diagram of a two-safety-division safety system according to disclosed embodiments.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. Likewise, the use of positional terms such as front, back, side, top, and bottom are used solely to provide a reference point for one particular orientation, and to enhance clarity. Their use does not imply that such an orientation is required. In operation, the disclosed air handling units can be used in any desired orientation.

Glossary

This application uses the terms that are defined below.

A "channel" is a device that measures a plant process parameter, which is used to initiate a safety action. It can also be referred to as a "measurement channel" or a "sensor."

A "division" is a redundant portion of a safety system that is isolated both physically and electrically from other portions. A safety division includes electronics that processes signals from multiple channels to initiate and control protective actions. Signal processing typically includes voting logic results from measurements of the same plant process parameters by channels in other divisions.

"Engineered Safety Feature" (ESF) is a group of plant components (eg. pumps, valves) designed to control the critical safety functions of the plant (eg. core reactivity shutdown, core heat removal, radiation isolation) in the case of an emergency situation at the nuclear power plant.

"Enhanced voting logic" is a variation from conventional two-out-of-four (2oo4) voting. Enhanced voting logic is described in greater detail below.

A "limiting condition of operation" (LCO) is a degraded nuclear power plant condition, such as can occur at a division with a failed measurement channel or a measurement channel taken out of service for testing. An LCO has a licensed operational time constraint governed by Nuclear Plant Technical Specifications which are written in accordance with 10 CFR 50.36. After that time constraint, plant operators must take remedial actions, such as placing the division with the failed channel in an actuated state (resulting in a 1-out-of-N voting configuration), reducing reactor power, or shutting down the reactor. The specific remedial action and the time permitted to take that action is dependent on the severity of the specific degraded condition.

A "plant safety system component control processor" (PSS CCP or CCP) is a controller in the nuclear reactor safety system whose function is to perform the component control logic.

A "plant safety system reactor protection processor" (PSS RPP, or RPP) is a controller in a nuclear reactor safety system whose function is to diversely calculate safety limit violations (partial trips) and initiate a reactor trip and/or ESF actuation based on redundant and diverse specific coincidence voting of the diverse partial trips.

A "reactor trip" (RT or "trip") is a protective function performed by the plant safety system when it detects an approach of a parameter to its safety limit. In nuclear engineering terms, a reactor trip involves the automatic shutdown of a nuclear reactor.

A "reactor trip breaker" (RTB) is a circuit within a nuclear power plant configured to actuate a reactor trip based on a reactor trip actuation signal.

A "single failure criterion" (SFC) is a requirement that a system which is designed to carry out a defined safety function (e.g., an Emergency Core Cooling System) must be capable of carrying out its mission in spite of the failure of any single component within the system or in an associated system which supports its operation.

A "partial trip signal" is the result of a single safety limit calculation. During normal operation 2ooN partial trip signals are needed to initiate an RT or ESF actuation. During degraded conditions, and after enhanced voting logic manual reconfiguration, an RT or ESF actuation can be generated by a single partial trip signal.

Overview

In general, a protection system is provided that achieves compliance with the single failure criterion (SFC) and prevents spurious actuation due to a single credible failure, with only two divisions compared to a system that requires four divisions to achieve this same performance. In this system, each of the two divisions includes the following features: (1) multiple calculations, each used to determine the approach to plant safety limits (and thereby the need for RT/ESF actuation); (2) fiber optic digital data communication to share its calculation results with the other division, for each safety limit; (3) voting logic to process the multiple calculation results for each safety limit; (4) logic to combine the voter outputs for each safety limit to generate the appropriate RT, ESF-1, ESF-N actuation signal(s), depending on the safety limit(s) in violation; and (5) interfaces to devices that respond to the RT and ESF actuation signals to execute the RT and ESF actuation functions.

Furthermore, for the five functions listed above, each of the two divisions is supplemented with the following features to prevent spurious actuation from each division: (1) each safety limit calculation is performed redundantly and diversely based on the data from redundant sensors or redundant groups of sensors; (2) the redundant and diverse calculation results are shared with the other division for each safety limit; (3) the outputs of the two diverse safety limit calculations from each division (four total) are interfaced to redundant and diverse voters; (4) the outputs of the diverse voters are interfaced to redundant and diverse combinational logic for the appropriate RT, ESF-1, ESF-N actuation signal(s), where each diverse signal path is filtered to ignore momentary signals; and (5) each diverse RT/ESF actuation signal output is combined in a 2oo2 configuration, with the two diverse outputs for RT having an unconventional energize-to-actuate configuration, but to comply with system level fail-safe regulatory criteria, the two divisions employ interconnected watchdog timers for an additional method of fail-safe RT actuation.

In addition, for conservative sensor failures that results in a safety limit calculation(s) that erroneously satisfies one of N votes, and thereby make the system susceptible to spurious RT/ESF actuation, the protection system includes calculation result bypass features. However, when a calculation result bypass is initiated, and for non-conservative failures that put the system in an SFC non-compliant configuration (that requires LCOs), the protection system includes a method of converting the voting logic to restore SFC compliance.

Two-Division Design

One advantage of a two-safety-division design over other designs with more divisions is lower plant capital cost, and lower plant operations and maintenance (O&M) cost. This is because there is significant cost associated with each safety division. Safety divisions must be physically separated from each other, leading to more seismically qualified building volume. Physical barriers are required between divisions for all components, including electronics and cables. Physical barriers prevent propagation of fire and flood to multiple divisions; they also provide personnel access security. Each safety division must also have its own safety grade power supply, that includes batteries and inverters in case of loss of normal electrical power. And each safety division must have its own support equipment such as HVAC. Furthermore, all equipment that directly supports the safety functions requires a very expensive quality and qualification testing program. In operation, all equipment in each safety division must be tested periodically to demonstrate it can perform its safety function. Each division must be quickly maintained in case of equipment failure, requiring on-site storage of spare parts. Both testing and maintenance require highly skilled labor with extensive training. Therefore, reducing the number of safety divisions improves the nuclear power economic case for initial capital, and for life time O&M costs related to personnel and spare parts.

In order to achieve single failure compliance, spurious actuation prevention, and testing/failure tolerance, the two-safety-division design uses: (1) enhanced voting logic; (2) diverse signal processing; and (3) energize-to-actuate equipment and watchdog timers.

An exemplary two-safety-division design, discussed below, employs two redundant and diverse measurement channel calculations in each division (four total), shared calculation results between the two divisions, redundant and diverse 2oo4 level 1 voting logic in each division, with the redundant and diverse outputs of the level 1 voting logic combined in two-out-of-two (2oo2) level 2 voting logic to prevent spurious RT or ESF actuation in each safety division. Since either safety division can provide the needed RT or ESF protective action, the safety system meets the single failure requirement.

Enhanced Voting Logic

Rather than associating one measurement channel with each of four safety divisions, the exemplary two-division design associates two channels with one safety division, and the other two channels with the other safety division. In this exemplary embodiment, level 1 enhanced voting logic is specific coincidence logic, which requires data sharing between the safety divisions. The data sharing is typically accomplished by point to point optical data links. The discussion that follows is in the context of one set of many like measurement channels in different divisions.

FIG. 1 is a block diagram of a two-safety-division safety system 100 according to disclosed embodiments. As shown in FIG. 1, the safety system 100 includes a first safety division 110 and a second safety division 115. The first safety division 110 includes a first division calculation module 120, a first division calculation-result-sharing module 123, and first division enhanced voting logic 126. The second safety division 115 includes a second division calculation module 130, a second division calculation-result-sharing module 133, and second division enhanced voting logic 136. The first division calculation module 120 receives signals from sensors S1 140, S2 143, S3 146, S4 150, S5 153, and S6 156. The second division calculation module 130 receives signals from sensors S7 160, S8 163, S9 166, S10 170, S11 173, and S12 176. Sensors S1 140, S2 143, and S3 146 are arranged into a first sensor set 180; sensors S4 150, S5 153, and S6 156 are arranged into a second sensor set 183; sensors S7 160, S8 163, and S9 166 are arranged into a third sensor set 186; and sensors S10 170, S11 173, and S12 176 are arranged into a fourth sensor set 189. Sensors S1 140, S4 150, S7 160, and S10 170 are arranged into a first sensor array 190; sensors S2 143, S5 153, S8 163, and S11 173 are arranged into a second sensor array 193; and sensors S3 146, S6 156, S9 166, and S12 176 are arranged into a third sensor array 196.

The first division calculation module 120 operates to take the sensor signals from sensors S1 140, S2 143, S3 146, S4 150, S5 153, and S6 156 and perform calculations on them to determine whether or not they indicate that safety action should be taken. For example, if the sensor S1 140 was a temperature sensor, the first division calculation module 120 might determine whether or not a temperature signal from the temperature sensor S1 140 was above a safety threshold. The results of these calculations are a series of first calculation results that identify whether or not the sensor signals from the sensors S1 140, S2 143, and S3 146 individually indicate that safety action should be taken, and a series of second calculation results that identify whether or not the sensor signals from the sensors S4 150, S5 153, and S6 156 individually indicate that safety action should be taken Collectively the first and second individual calculation results can be referred to as calculation results $D_A$.

The first division calculation-result-sharing module 123 operates to send the calculation results $D_A$ from the first division 110 to the second division calculation-result-sharing module 133 in the second division 115.

The first division enhanced voting logic 126 operates to generate a first safety demand based on the calculation results $D_A$ and calculation results $D_B$ received from the second division 115. The precise voting logic employed by the first division enhanced voting logic 126 can be altered depending upon which of the calculation results $D_A$, $D_B$ are considered operable. Operability of a calculation result is determined based on the operability of the sensors used to generate that calculation result. For example, if all of the calculation results $D_A$, $D_B$ are in operation, then the first division enhanced voting logic 126 can perform 2oo4 voting. If, however, fewer of the calculation results $D_A$, $D_B$ are valid, then 2oo3, 2oo2, or even 1oo1 voting can be performed. Greater detail as to how the first division enhanced voting logic 126 can be modified will be described below.

The second division calculation module 130 operates to take the sensor signals from sensors S7 160, S8 163, S9 166, S10 170, S11 173, and S12 176 and perform calculations on them to determine whether or not they indicate that safety action should be taken. For example, if the sensor S7 160 was a temperature sensor, the second division calculation module 130 might determine whether or not a temperature signal from the temperature sensor S7 160 was above a safety threshold. The results of these calculations are a series of third calculation results that identify whether or not the sensor signals from the sensors S7 160, S8 163, and S9 166 indicate that safety action should be taken, and a series of fourth calculation results that identify whether or not the sensor signals from the sensors S10 170, S11 173, and S12 176 indicate that safety action should be taken. Collectively the third and fourth calculation results can be referred to as calculation results $D_B$.

The second division calculation-result-sharing module 133 operates to send the calculation results $D_B$ from the second division 115 to the first division calculation-result-sharing module 123 in the first division 110.

The second division enhanced voting logic 136 operates to generate a second safety demand based on the calculation results $D_B$ and calculation results $D_A$ received from the first division 110. The precise voting logic employed by the second division enhanced voting logic 136 can be altered depending upon which of the calculation results $D_A$, $D_B$ are valid. For example, if all of the calculation results $D_A$, $D_B$ are valid, then the second division enhanced voting logic 136 can perform 2oo4 voting. If, however, fewer of the calculation results $D_A$, $D_B$ are valid, then 2oo3, 2oo2, or even 1oo1 voting can be performed. Greater detail as to how the second division enhanced voting logic 136 can be modified will be described below.

Sensors S1 140, S2 143, S3 146, S4 150, S5 153, S6 156, S7 160, S8 163, S9 166, S10 170, S11 173, and S12 176 each measure a specific safety parameter for the nuclear power plant. For example, these parameters might include reactor coolant temperature, reactor pressure, reactor coolant flow, neutron flux, or any parameter related to the safety of the nuclear power plant.

The first sensor set 180 is connected to the first division calculation module 120 and provides first sensor data used to generate the first calculation results; the second sensor set 183 is also connected to the first division calculation module 120 and provides second sensor data used to generate the second calculation results; the third sensor set 186 is connected to the second division calculation module 130 and provides third sensor data used to generate the third calculation results; and the fourth sensor set 189 is connected to the second division calculation module 130 and provides fourth sensor data used to generate the fourth calculation results. In the embodiment disclosed in FIG. 1, the first, second, third, and fourth sensor sets 180, 183, 186, 189 are comparable sensor sets. For example, if sensors S1 140 is a temperature sensor, S2 143 is a pressure sensor, and S3 146 is a neutron flux sensor, then sensors S4 150, S7 160, and S10 170 will be temperature sensors, sensors S5 153, S8 163, and S11 173 will be pressure sensors, and sensors S6 156, S9 166, and S12 176 will be neutron flux sensors. Like sensor types will measure the same reactor parameter.

The first sensor array 190 includes sensors S1 140, S4 150, S7 160, and S10 170, which all measure the same reactor parameter. For example if sensors S1 140, S4 150, S7 160, and S10 170 are all temperature sensors, they will all measure the reactor temperature.

The second sensor array 193 includes sensors S2 143, S5 153, S8 163, and S11 173, which all measure the same reactor parameter. For example if sensors S2 143, S5 153, S8 163, and S11 173 are all pressure sensors, they will all measure the reactor pressure.

The third sensor array 196 includes sensors S3 146, S6 156, S9 166, and S12 176, which all measure the same reactor parameter. For example, if sensors S3 146, S6 156, S9 166, and S12 176 are all neutron flux sensors, they will all measure the neutron flux of the reactor.

The level 1 enhanced voting logic within each of the disclosed safety divisions 110, 115 uses calculation results, commonly referred to as partial trip signals, which are available either from measurement channels directly connected to the division electronics or via data sharing between safety divisions. The level 1 enhanced voting logic is normally in a 2oo4 configuration. This means that each division is in SFC compliance because it will actuate based on its own two calculation results (with no reliance on the calculation results from the other division). In addition each division will actuated based on the two calculation results from the other division or based on a combination of calculation results from both divisions. The 2oo4 enhanced voting logic within each safety division is reconfigured in the following manner based on like measurement channel failures or data link failures.

Although FIG. 1 shows that each of the first through fourth sets of safety sensors 180, 183, 186, 189 includes three sensors, this is by way of example only. Alternate embodiments can include more or fewer sensors within each set of safety sensors 180, 183, 186, 189.

One Measurement Channel Fails in One Safety Division

Figure 2A:
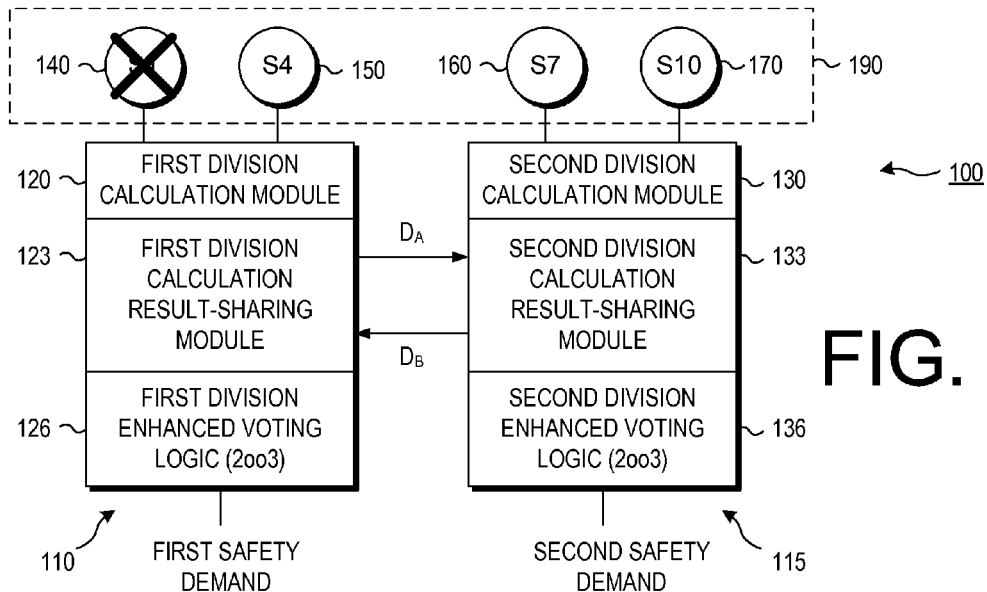
FIG. 2A is a block diagram of a two-safety-division safety system in an LCO, in which a single sensor element fails in a single safety division, according to disclosed embodiments.

FIG. 2A is a block diagram of a two-safety-division safety system 100, in which a single sensor element (i.e., measurement channel) fails in a single safety division, according to disclosed embodiments. As shown in FIG. 2A, sensor S1 140, within the first sensor array 190, is a failed sensor. As noted above, all of the sensor elements (S1 140, S4 150, S7 160, S10 170) in the first sensor array 190 are like measurement channels. In other words, each is measuring the same system parameter.

If one of these four like measurement channels fails (e.g., sensor element S1 140), then for the associated redundant safety divisions, the level 1 voting is inherently 2oo3 for both first safety division 110 and the second safety division 115. In other words, the failed channel (i.e., sensor) generates no calculated data value and cannot contribute to the safety demand. Therefore, two of the remaining three working measurement channels are needed to generate a safety demand. This configuration prevents spurious actuation due to an additional channel failure.

However, this configuration would require an LCO with an extended time limit, because even though there are three available measurement channels, there is some potential that the two channels in the same division could be adversely affected by a single failure within that division (e.g., a power source anomaly that causes non-conservative drift of both channels). Therefore, if the failed channel cannot be restored within the extended LCO time limit, an alternate means of restoring the system to SFC compliance is needed. SFC compliance is achieved by ensuring that each division can actuate based solely on its own calculation results (with no reliance on the calculation results from the other division). This is accomplished by converting the enhanced voting logic, as shown in FIG. 2B.

Figure 2B:
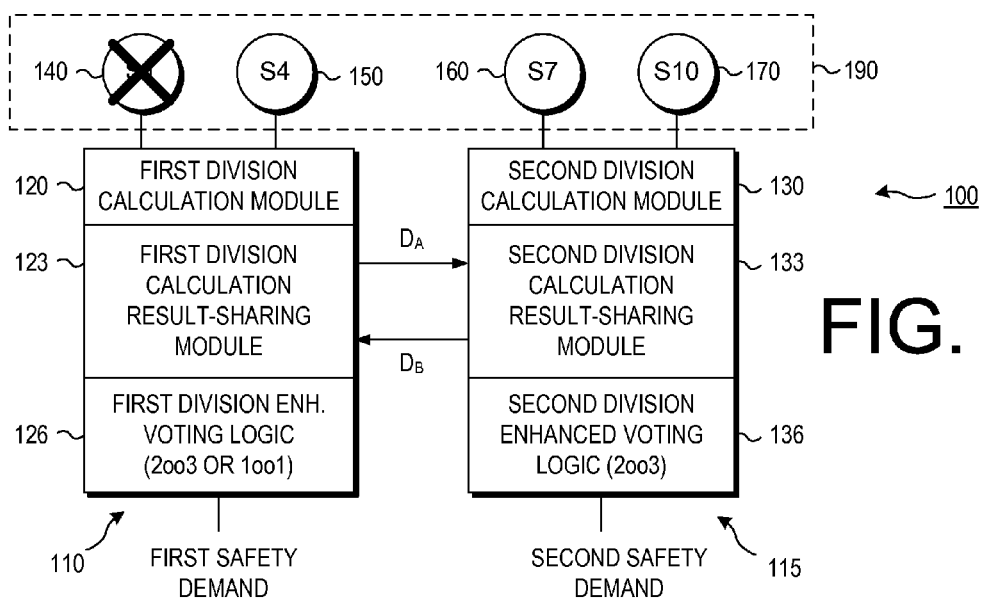
FIG. 2B is a block diagram of the two-safety-division safety system of FIG. 2A, in which a single sensor element fails in a single safety division, and in which the LCO has been cleared, according to disclosed embodiments.

FIG. 2B is a block diagram of the two-safety-division safety system of FIG. 2A, in which a single sensor element fails in a single safety division, and in which the LCO has been cleared, according to disclosed embodiments. As shown in FIG. 2B, the sensor S1 140 is a failed channel. As a result, the first enhanced voting logic 126 in the first division 110 is adjusted such that it will generate a safety demand based only on the calculation result from sensor S4 154, or 2oo3 calculation results from sensors S4, S7 160 and S10 170. This is the equivalent of the original 2oo3 voting for the first division 110, supplemented by changing it from 2oo3 to '2oo3 or one-out-of-one (1oo1) for sensor S4.' The level 1 voting logic in the second division 115 remains 2oo3 because it receives calculation data generated based on the three operable sensors S4 150, S7 160, S10 170.

With this voting configuration, a single failure that affects the first division 110 or the second division 115, including all the measurement channels associated with either division 110, 115, will not prevent at least one division 110, 115 from generating a protective action safety demand. For this reason, the original LCO (shown with respect to FIG. 2A) is cleared and there is no additional LCO for this configuration.

Although it is possible to automatically convert to the level 1 enhanced voting logic configuration of '2oo3 or 1oo1' immediately upon the failure in sensor S1 140, this voting configuration makes the first division 110 more susceptible to spurious actuation. Therefore, it is safer for the plant to remain in the original 2oo3 LCO condition while trying to restore sensor S1 140 (i.e., the failed measurement channel). Conversion to the level 1 enhanced voting logic configuration of '2oo3 or 1oo1' can then be manually initiated if the sensor S1 140 cannot be restored within the LCO time constraint.

It should also be noted that with the configuration of FIG. 2B, if there is a single erroneous trip/actuation signal from the one working measurement channel connected to the first division 110, then only the first division 110 will spuriously actuate; the second division will not spuriously actuated because it remains in a 2oo3 voting logic configuration. For ESF functions, spurious actuation of only one division limits the plant transient effect. However, if there are trip/actuation signals from any two measurement channels, then the signals are considered valid and the 2oo3 voting logic in both divisions 110, 115 ensures both ESF divisions actuate correctly. This distinction of limiting spurious actuation to a single division is irrelevant for RT, because actuation of either division will cause a plant trip.

One Measurement Channel Fails in Each Safety Division

Figure 3A:
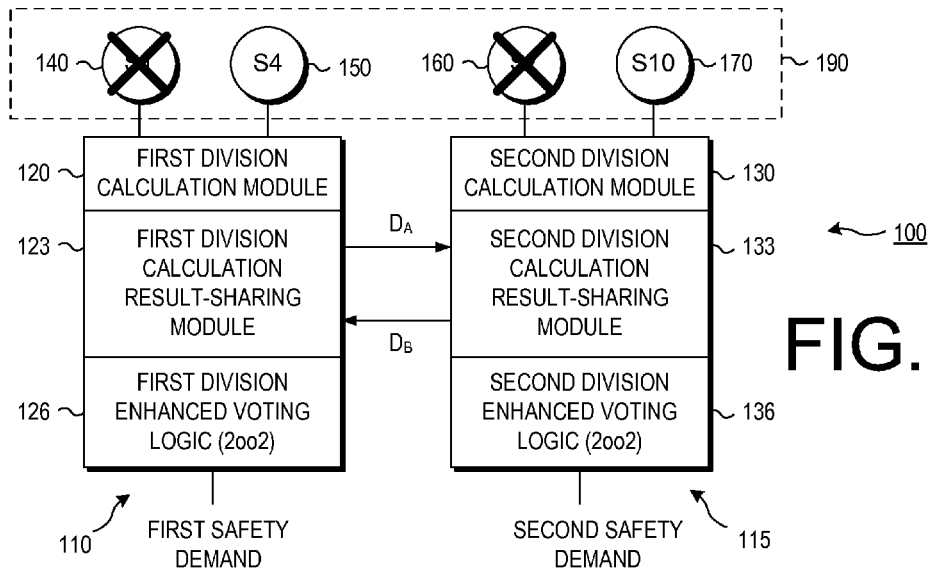
FIG. 3A is a block diagram of the two-safety-division safety system of FIG. 1 in an LCO, in which a single sensor element (i.e., measurement channel) fails in each safety division, according to disclosed embodiments.

FIG. 3A is a block diagram of a two-safety-division safety system 100 in an LCO, in which a single sensor element (i.e., measurement channel) fails in each safety division, according to disclosed embodiments. As shown in FIG. 3A, the sensor S1 140 is a failed channel, and the sensor S7 160 is a failed channel.

If two measurement channels fail (e.g., sensors S1 140 and S7 160), one connected to each of the first and second safety divisions 110, 115, then for the associated redundant safety function(s), the level 1 voting inherently becomes 2oo2 for both the first safety division 110 and the second safety division 115. In other words, calculation data based on sensor data from the two failed channels (e.g., sensors S1 140 and S7 160) cannot contribute to the safety demand. Therefore, both of the remaining two working measurement channels (e.g., sensors S4 150 and S10 170) are needed to generate a safety demand.

This configuration would require an LCO with a relatively short time limit, however, because an additional measurement channel failure in either division 110, 115 would prevent the generation of the protective action from both divisions 110, 115. In other words, if either of the remaining sensors (S4 150 or S10 170) failed, the enhanced voting logic 126, 136 in each division would fail to get the two pieces of calculation data they need to perform 2oo2 voting.

During the LCO, an effort will be made to restore one or both of the measurement channels (i.e. sensors S1 140, S7 160) to operational status. What action should be taken depends on whether and how these efforts are successful.

If both measurement channels can be restored prior to the expiration of the LCO, then no further action need be taken. The LCO expires and normal operation resumes.

If only one measurement channel (e.g., sensor S1 140 or sensor S7 160) can be restored, level 1, then '2oo3 or 1oo1' enhanced voting logic can be manually deployed in the division 110, 115 associated with the remaining failed measurement channel, as described above with respect to FIG. 2B.

Figure 3B:
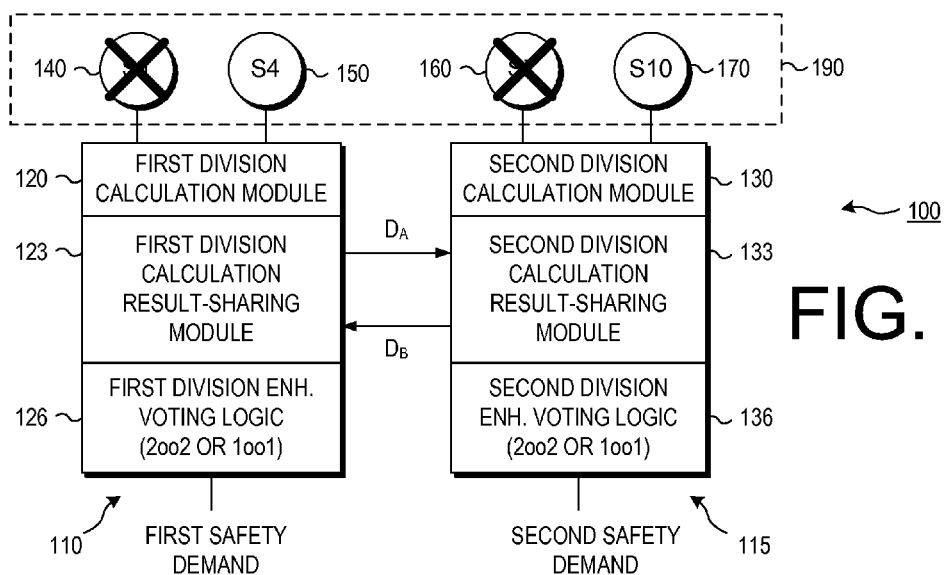
FIG. 3B is a block diagram of the two-safety-division safety system of FIG. 3A, in which a single sensor element in each division fails, and in which the LCO has been cleared, according to disclosed embodiments.

If neither measurement channel can be restored, however, then the level 1 voting logic can be manually changed to '2oo2 or 1oo1' in each division 110, 115. FIG. 3B is a block diagram of the two-safety-division safety system of FIG. 1, in which a single sensor element in each division fails, and in which the LCO has been cleared, according to disclosed embodiments.

As shown in FIG. 3B, the voting in both the first enhanced voting logic 126 and the voting in the second enhanced voting logic 136 are both changed to '2oo2 or 1oo1.' In each case the 1oo1 is associated with the operating channel (i.e., sensor) connected to that division 110 or 115, while the 2oo2 is associated with both remaining operating channels (i.e., sensors) connected to the divisions 110, 115.

This brings the system back into single failure criterion compliance, since voting can be actuated even if one of the divisions 110, 115 fails to operate.

Two Measurement Channels Fail in a Single Safety Division

Figure 4:
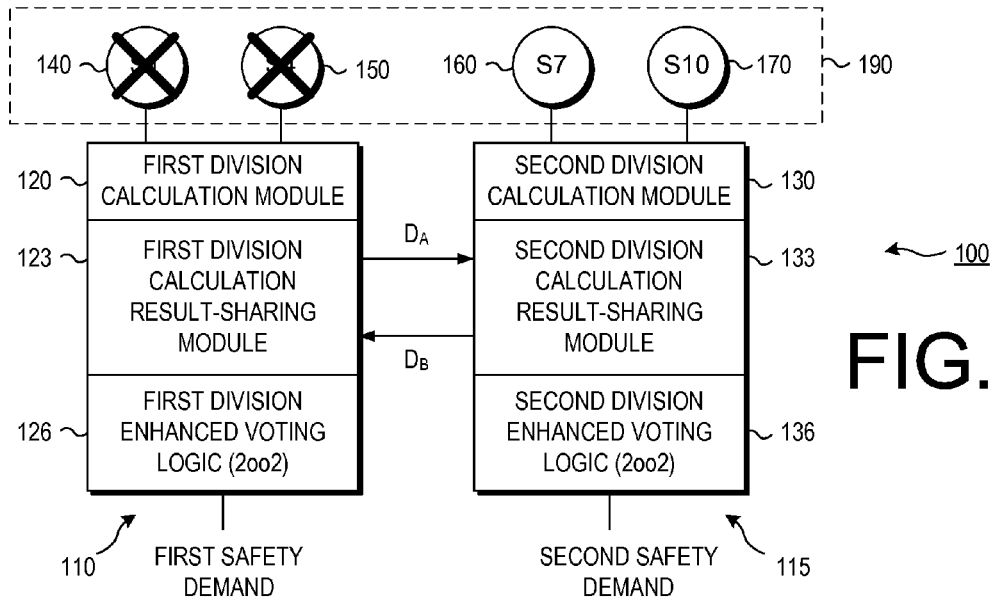
FIG. 4 is a block diagram of the two-safety-division safety system of FIG. 1, in an LCO, in which a two sensor elements (i.e., measurement channels) fail in a single safety division, according to disclosed embodiments.

FIG. 4 is a block diagram of the two-safety-division safety system 100 of FIG. 1, in an LCO, in which two sensor elements (i.e., measurement channels) fail in a single safety division 110, 115, according to disclosed embodiments. As shown in FIG. 4, the sensor S1 140 is a failed channel, and the sensor S4 150 is a failed channel.

As shown in FIG. 4, if two measurement channels fail in the same safety division 110 or 115, then for the associated redundant safety function(s) the level 1 voting inherently becomes 2oo2 for both the first safety division 110 and the second safety division 115. This configuration would require an LCO with a relatively short time limit because the system no longer meets the single failure criterion.

During the LCO, an effort will be made to restore one or both of the measurement channels (i.e. sensors S1 140, S4 150) to operational status. What action should be taken depends on whether and how these efforts are successful.

If one measurement channel can be restored, then level 1 '2oo3 or 1oo1' enhanced voting logic can be manually deployed for the first division 110, while 2oo3 voting logic can be maintained for the second division 115, as described above with respect to FIG. 2B. In this case, the original LCO is cleared.

However, if neither of the failed measurement channels can be restored by the end of the LCO time limit, the LCO would require a plant shutdown, since single failure criterion is no longer met.

A Single Data Link Fails Between the Two Safety Divisions

If a single data link fails between the first and second safety divisions 110, 115, then for all safety functions for the safety division that are unable to receive data from the other division, the level 1 voting is inherently 2oo2. In other words, the partial trips normally transmitted on the failed data link cannot contribute to the safety demand for the safety division that is unable to receive the data from the other division. As a result, the two remaining partial trips from the working measurement channels connected to the division are needed to generate a safety demand. The other division is not affected, so it remains in a 2oo4 configuration for level 1 voting with respect to all safety functions.

Figure 5:
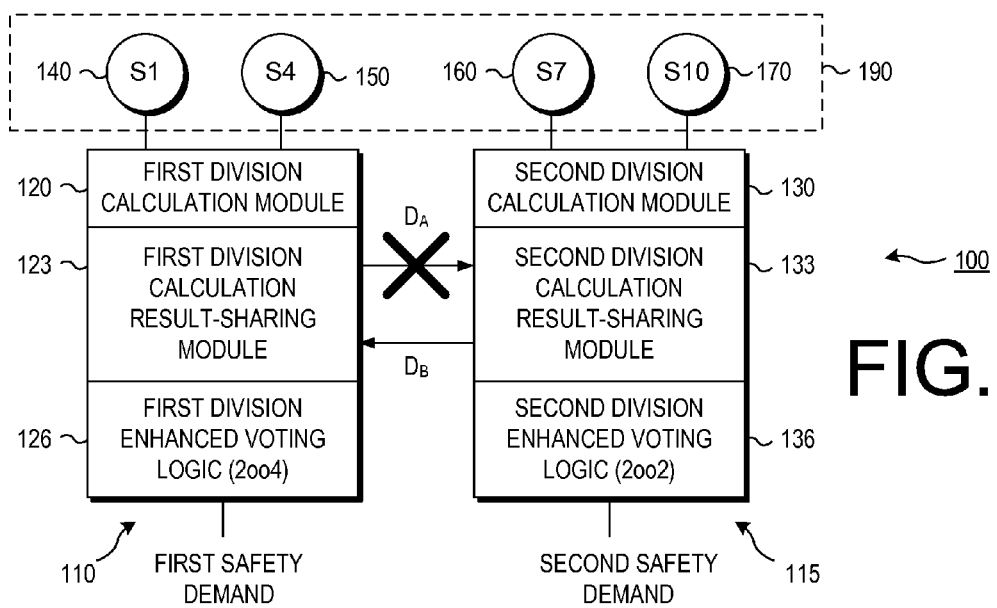
FIG. 5 is a block diagram of the two-safety-division safety system of FIG. 1, in which a single data link fails between the first and second safety divisions, according to disclosed embodiments.

FIG. 5 is a block diagram of the two-safety-division safety system 100 of FIG. 1, in an LCO, in which a single data link fails between the first and second safety divisions 110, 115, according to disclosed embodiments. As shown in FIG. 5, the data link $D_A$ from the first division 110 to the second division 115 is a failed data link.

As shown in FIG. 5, if the data link $D_A$ received by the second safety division 115 is a failed link, then the level 1 voting in the second safety division 115 inherently becomes 2oo2. In other words, the second safety division 115 provides a second safety demand requesting remedial action only when calculation signals generated based on both the sensor S7 160 and the sensor S10 170 indicate that action should be taken.

The first division 110 retains 2oo4 voting logic, since it still receives data from all four sensors S1 140, S4 150, S7 160, and S10 170.

This degraded configuration is less reliable than a configuration in which both the first and second divisions employ 2oo4 voting logic. However, it still meets the single failure criterion, so no LCO is required. Restoring the failed data link to normal operability in a reasonable time frame is governed by Maintenance Rule 10 CFR 50.65, not by plant Technical Specifications 10 CFR 50.36.

A Measurement Channel Provided to a Division and a Data Link Provided from the Same Division Both Fail If a measurement channel provided to a division 110, 115 and a data link $D_A$, $D_B$ provided from the same division both fail, then the level 1 voting in the other division inherently becomes 2oo2. In other words, the other division (i.e. the one with the failed receive data link) would produce a second safety demand that orders remedial action only if both sensors provided to that division indicated that action was required. This does not require an LCO because that division can actuate based on its own measurement channels.

The division with the failed measurement inherently becomes a 2oo3 configuration for level 1 voting, since it receives signals from only three sensors. This would require an LCO with an extended time limit, because even though there are three available measurement channels, there is some potential that the two channels received from the other division could be adversely affected by a single failure within that division (e.g., a power source anomaly that causes non-conservative drift of both channels).

Figure 6A:
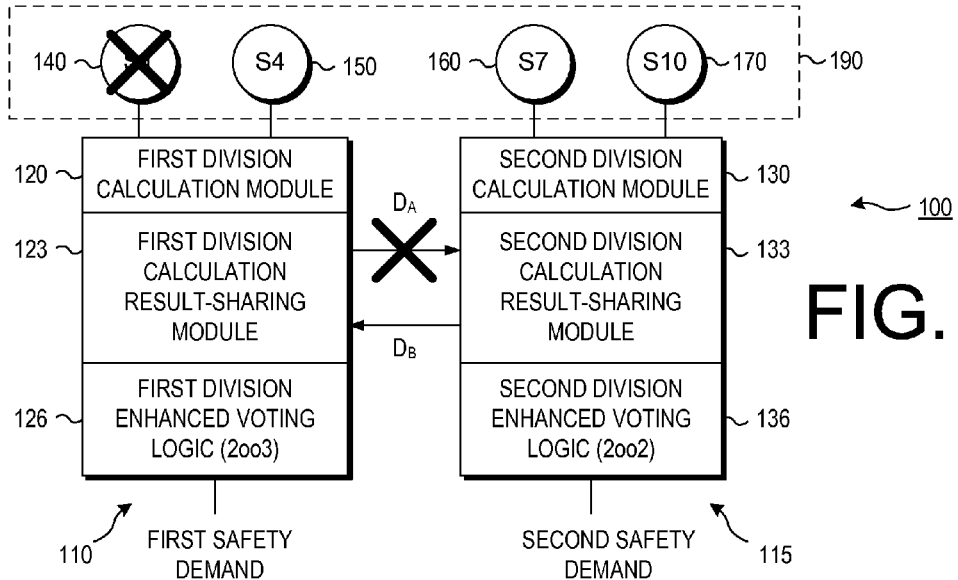
FIG. 6A is a block diagram of a two-safety-division safety system of FIG. 1, in an LCO, in which a single data link fails from a first safety division to a second safety division, and a measurement channel fails in the first safety division, according to disclosed embodiments.

FIG. 6A is a block diagram of the two-safety-division safety system 100 of FIG. 1, in an LCO, in which a single data link fails from a first safety division 110 to a second safety division 115, and a measurement channel fails in the first safety division 110, according to disclosed embodiments. As shown in FIG. 6A, the data link $D_A$ from the first division 110 to the second division 115 is a failed data link, and the sensor S1 140 connected to the first division 110 is a failed measurement channel.

As shown in FIG. 6A, if the data link $D_A$ received by the second safety division 115 is a failed link, then the level 1 voting in the second safety division 115 inherently becomes 2oo2. In other words, the second safety division 115 provides a second safety demand requesting remedial action only when signals from both the sensor S7 160 and the sensor S10 170 indicate that action should be taken. This does not violate the single failure criterion because even if the first safety division 110 failed, the second safety division 115 would still be able to perform 2oo2 voting.

The level 1 voting in the first division 110 in this example inherently becomes 2oo3, since it only receives data from three sensors S4 150, S7 160, and S10 170. This configuration violates the single failure criterion, however, since if the second safety division 115 failed, the first safety division 110 would not be able to perform 2oo3, or even 2oo2, voting.

Figure 6B:
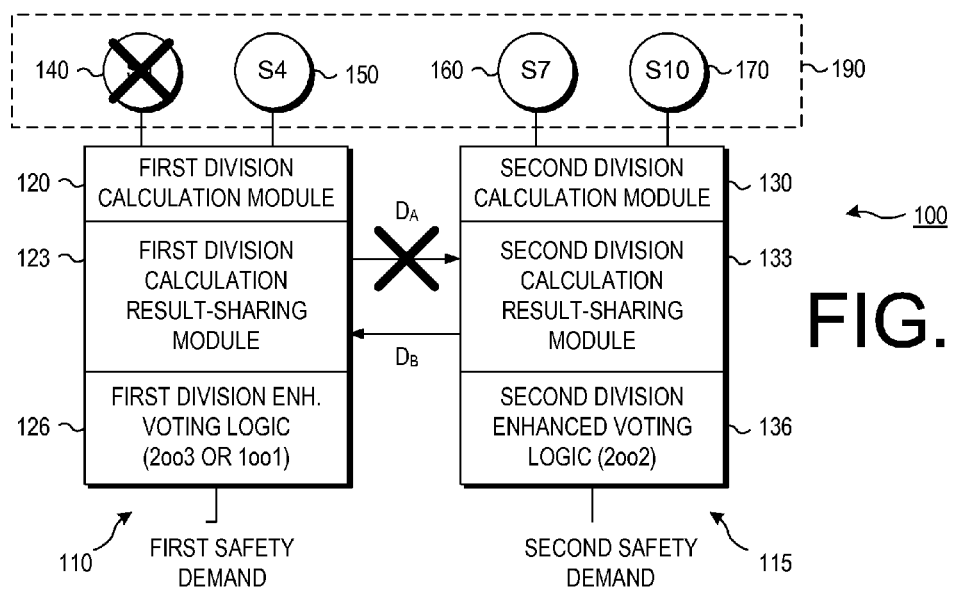
FIG. 6B is a block diagram of the two-safety-division safety system of FIG. 6A, in which a single data link fails from a first safety division to a second safety division, and a measurement channel fails in the first safety division, and in which the LCO has been cleared, according to disclosed embodiments.

Therefore, if the failed channel (sensor S1 140) in this configuration cannot be restored within an extended LCO time limit, the voting logic in that division is manually converted from 2oo3 voting to '2oo3 or 1oo1' voting, as shown in FIG. 6B. This brings the system 100 back into single failure criterion compliance.

A Measurement Channel Provided to a Division and a Data Link Provided from the Other Division Both Fail If a receive data link and a measurement channel both fail in the same safety division, then for the associated safety function(s), the normal level 1 2oo4 voting cannot be satisfied for the affected division. The other division is not affected, however, so it remains in a 2oo3 voting configuration.

Figure 7A:
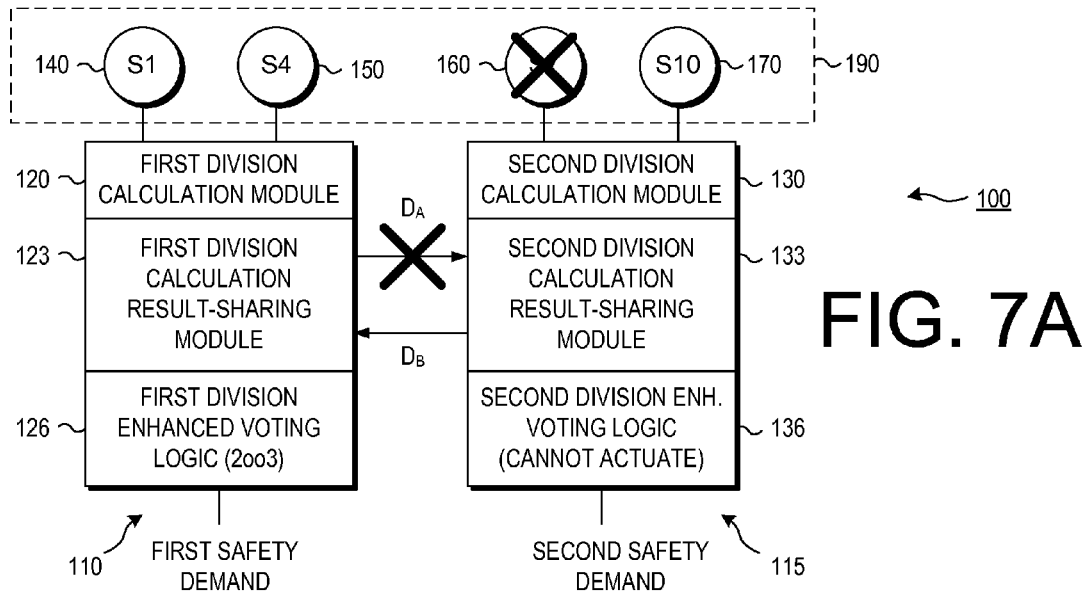
FIG. 7A is a block diagram of the two-safety-division safety system of FIG. 1, in an LCO, in which a single data link fails from a first safety division to a second safety division, and a measurement channel fails in the second safety division, according to disclosed embodiments.

FIG. 7A is a block diagram of the two-safety-division safety system 100 of FIG. 1, in an LCO, in which a single data link fails from a first safety division 110 to a second safety division 115, and a measurement channel fails in the second safety division 115, according to disclosed embodiments. As shown in FIG. 7A, the data link $D_A$ from the first division 110 to the second division 115 is a failed data link, and the sensor S7 160 connected to the second division 115 is a failed measurement channel.

The level 1 voting in the first division 110 in this example inherently becomes 2oo3, since it only receives calculation data based on the outputs of three sensors S1 140, S4 150, and S10 170.

Since the affected division cannot generate a protective action safety demand, this configuration would require an LCO with a relatively short time limit because the system no longer meets the single failure criterion.

If the failed measurement channel can be restored, while leaving the data link failed, the system achieves the configuration described in item 4, above, which clears the LCO.

If the failed data link can be restored, while leaving the measurement channel failed, the system achieves the configuration described with respect to FIG. 2A, above. This allows manually converting the level 1 voting logic to manage the LCO condition as described above with respect to FIG. 2B.

Figure 7B:
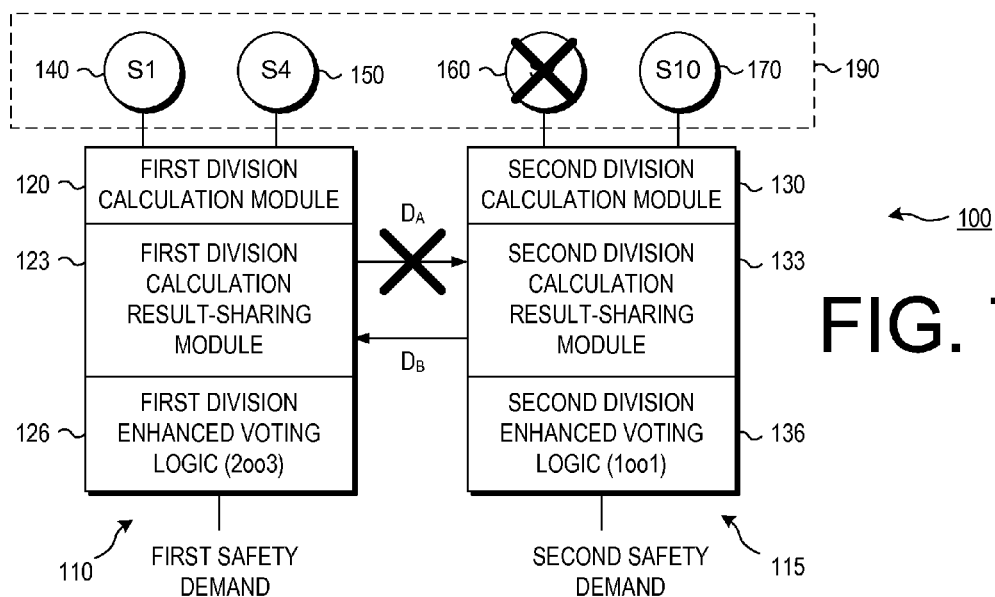
FIG. 7B is a block diagram of the two-safety-division safety system of FIG. 7A, in which a single data link fails from a first safety division to a second safety division, and a measurement channel fails in the second safety division, and in which the LCO has been cleared, according to disclosed embodiments.

If neither failure can be restored, then level 1 voting can be manually converted to 1oo1 for the second safety division 115, as shown with respect to FIG. 7B. This 1oo1 voting makes that second division 115 capable of generating a protective action safety demand based on its single operable measurement channel. However, it is susceptible to generating a spurious protective action safety demand if a failure of that measurement channel occurs. Although this is a degraded configuration for both safety divisions, each division is capable of generating a protective action safety demand based on measurement channels from its own division. Therefore, the overall system still meets the single failure criterion, so there is no LCO.

Manual Reconfiguration of the Voting Logic

As discussed above, while it is possible to automatically reconfigure the voting logic based on the detection of a failed measurement channel or data link, it is often desirable to manually reconfigure the voting logic so the system is less vulnerable to spurious actuation for as long as possible (i.e., based on the LCO completion time), while addressing the cause of the failure.

However, when necessary, reconfiguration of the voting logic to clear an LCO can be done in a relatively straightforward manner. The logic to do the reconfiguration is shown in FIG. 8, which is a circuit 800 for the manual reconfiguration of voting logic, according to disclosed embodiments.

Figure 8:
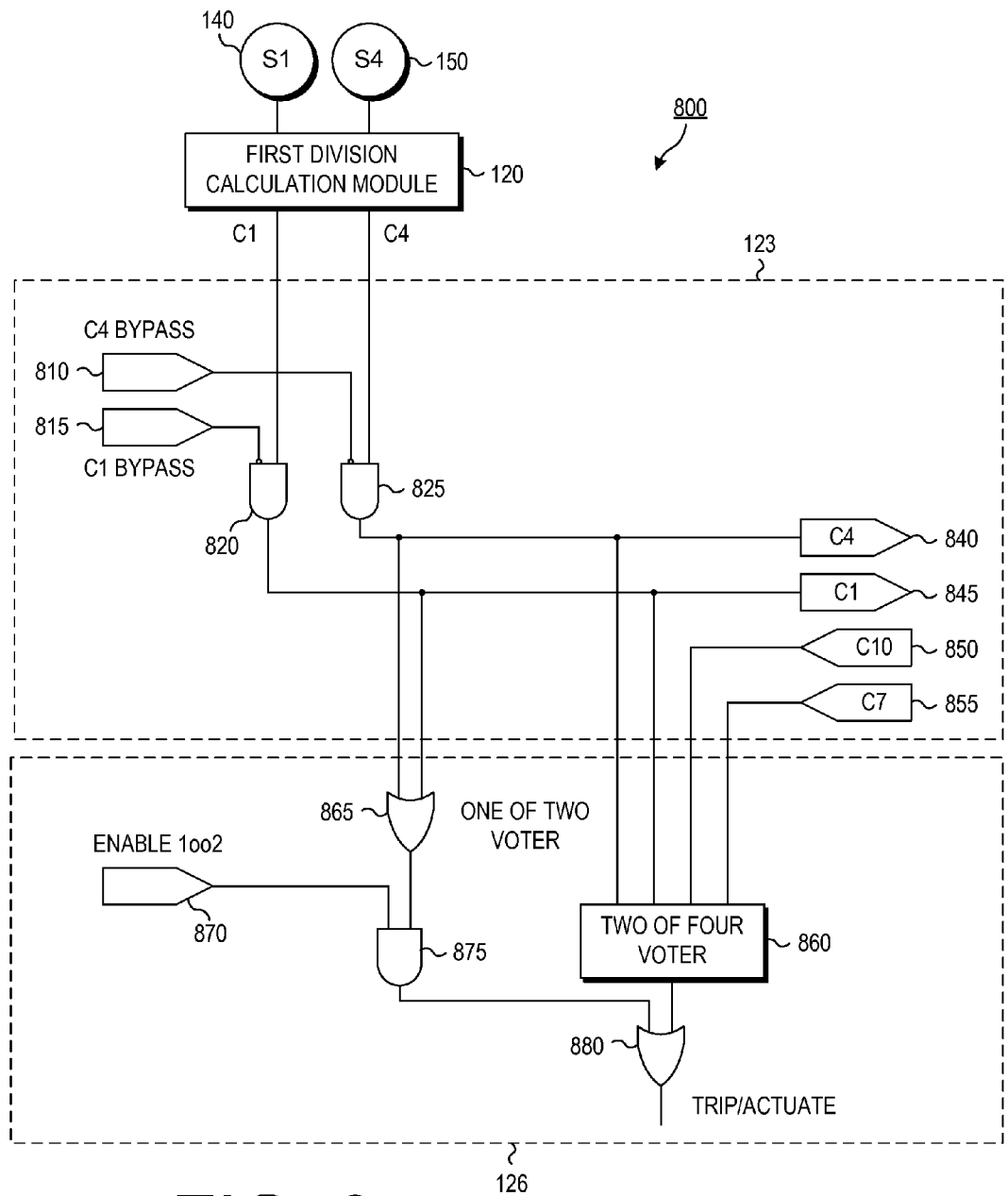
FIG. 8 is a circuit for the manual reconfiguration of voting logic, according to disclosed embodiments.

As shown in FIG. 8, the circuit 800 includes sensors S1 140 and S4 150, the first division calculation module 120, a C4 bypass input terminal 810, a C1 bypass input terminal 815, first and second AND gates 820, 825, a C4 output terminal 840, a C1 output terminal 845, a C10 input terminal 850, a C7 input terminal 855, a two-of-four voter 860, a one-of-two voter 865, a 1oo2 enable input terminal 870, a third AND gate 875, and an OR gate 880.

The sensor S1 140 generates a first sensor signal based on a measured parameter of the nuclear power plant. Likewise, the sensor S4 150 generates a second [signals 3 and 4 come from the second division (ie. C7 and C10).] sensor signal based on the same parameter of the nuclear power plant measured at a different sensor.

The first division calculation module 120 receives the first and fourth sensor signals and uses them to generate first and fourth calculation results C1 and C4, which are provided to the first division calculation-result-sharing module 123, which contains the remainder of circuit 800.

The C4 bypass input terminal 810 receives a signal indicating whether or not the fourth calculation result C4 resulting from the fourth sensor signal should be blocked. The C4 bypass input terminal 810 receives a LOW signal if the fourth calculation result C4 should be blocked, and a HIGH signal if the fourth calculation result C4 should be passed normally.

Similarly, the C1 bypass input terminal 815 receives a signal indicating whether or not the first calculation result C1 resulting from the first sensor signal should be blocked. The C1 bypass input terminal 815 receives a LOW signal if the first calculation result C1 should be blocked, and a HIGH signal if the first calculation result C1 should be passed normally.

The first AND gate 820 receives the C1 bypass signal from the C1 bypass input terminal 815, and the first calculation results C1 from the first division calculation module 120. If the C1 bypass signal is HIGH, then the first AND gate 820 generates an output signal equivalent to the first calculation results C1. If, however, the C1 bypass signal is LOW, then the first AND gate 820 generates a LOW output signal, regardless of the value of the first calculation result C1.

Similarly, the second AND gate 825 receives the C4 bypass signal from the C4 bypass input terminal 810, and the fourth calculation results C4 from the first division calculation module 120. If the C4 bypass signal is HIGH, then the second AND gate 825 generates an output signal equivalent to the fourth calculation results C4. If, however, the C4 bypass signal is LOW, then the second AND gate 825 generates a LOW output signal, regardless of the value of the fourth calculation result C4.

The C4 output terminal 840 receives the output of the second AND gate 825, and provides this value to the second division calculation-result-sharing module 133 in the second division 115.

The C1 output terminal 845 receives the output of the first AND gate 820, and provides this value to the second division calculation-result-sharing module 133 in the second division 115.

The C10 input terminal 850 receives the tenth calculation result C10 from the second division calculation-result-sharing module 133. It should be noted that the second division 115 will have a circuit similar to the circuit 800 in the first division 110. As a result, the tenth calculation result C10 may be blocked (i.e., set to a LOW value, regardless of its calculated value) if a tenth bypass signal is active in the second division 115.

Likewise, the C7 input terminal 855 receives the seventh calculation result C7 from the second division calculation-result-sharing module 133. It should be likewise noted that since the second division 115 will have a circuit similar to the circuit 800 in the first division 110, the seventh calculation result C7 may be blocked (i.e., set to a LOW value, regardless of its calculated value) if a seventh bypass signal is active in the second division 115.

The two-of-four voter 860 receives the first, fourth, seventh, and tenth calculation results C1, C4, C7, C10, and performs a two-of-four vote based on these four signals. In other words, the two-of-four voter 860 will produce a HIGH output if any two of the first, fourth, seventh, and tenth calculation results C1, C4, C7, C10 are HIGH.

In the case in which one or two of the first, fourth, seventh, and tenth calculation results C1, C4, C7, C10 are blocked, the two-of-four voter 860 effectively defaults to two-of-three or two-of-two voting. If, however, three of the first, fourth, seventh, and tenth calculation results C1, C4, C7, C10 are blocked, then the two-of-four voter 860 cannot perform proper voting.

The one-of-two voter 865 receives the first and fourth calculation results C1 and C4, and performs a one-of-two vote based on these two signals. In other words, the one-of-two voter 865 will produce a HIGH output if either of the first and fourth calculation results C1 and C4 are HIGH. In the disclosed embodiment, the one-of-two voter 865 is on OR gate. However, in alternate embodiments a different one-of-two voter 865 can be employed.

The 1oo2 enable input terminal 870 receives a 1oo2 enable signal that indicates whether one-of-two voting should be used in the first division enhanced voting logic 126. If the 1oo2 enable signal is HIGH then one-of-two voting is enabled. If, however, the 1oo2 enable signal is LOW, then two-of-four (or two-of-three or two-of-two voting, as appropriate) is enabled.

The third AND gate 875 receives the 1oo2 enable signal and the results of the one-of-two voter 865. If the 1oo2 enable signal is HIGH, it passes the output of the one-of-two voter 865; and if the 1oo2 enable signal is LOW, it passes a LOW signal regardless of the output of the one-of-two voter 865.

The OR gate 880 receives the output of the third AND gate 875 and the two-of-four voter 860, and provides an ORed result of the two output signals as a trip/actuate signal. In operation, if the 1oo2 enable signal is HIGH, then the trip/actuate signal will be the same as the output of the one-of-two voter 865; and if the 1oo2 enable signal is LOW, then the trip/actuate signal will be the same as the output of the two-of-four voter 860.

As show in FIG. 8, the reconfiguration to clear the LCO is done by the operator applying Bypass and Enable directives to the voting logic. For example, consider the situation in which one of four like measurement channels fails (i.e., failure of channel S4 150). This is comparable to the example shown above with respect to FIG. 2B.

If the failure results in a non-trip condition from channel S4 150, there is no need for immediate operator action. However, if channel S4 150 fails in a manner that gets resulting calculation result C4 would generate a spurious partial trip signal, then the operator would immediately activate the C4 bypass signal (i.e., set the C4 bypass signal to LOW). This action would eliminate the threat of a spurious RT/ESF actuation due to failure of a second channel. This action would also result in an LCO, because the first division is dependent on the second division to satisfy its 2oo3 voting logic (ie. the system is no longer SFC compliant). The LCO establishes the completion time to restore the failed channel to service. If the failed channel cannot be restored within the LCO completion time, the operator would activate the 1oo2 enable signal. This allows the first division 110 to actuate based on a single channel (ie. its own channel), and therefore restores the system to single failure compliance.

The four channel configuration with 2oo4 Level 1 voting assumes that the four measurement channels are redundant measurements of the same process parameter. If this is not the case then special techniques will be needed. For example, conventional pressurized water reactors (PWRs) and advanced light water reactors (ALWRs) require four divisions of excore nuclear instrumentation because the large core diameter permits an excore instrument channel to detect core anomalies in only three quadrants of the reactor, not all four quadrants. Therefore, to detect anomalies in all core quadrants, with at least two channels (to avoid spurious actuation due to a single channel failure), and to meet the single failure criterion, four divisions are required. With a smaller core diameter, a two division design with four excore instrument channels, requires that each excore detector detect anomalies in all four core quadrants. Then with two excore detectors per division, located on opposite sides of the core and arranged in a 2oo2 configuration, that is, with two detectors for the first division 110 and two detectors for the second division 115, all anomalies can be detected by either division, and a single failure of one division can be accommodated.

Method of Operation of Correction of a Single Safety Division

Figure 9:
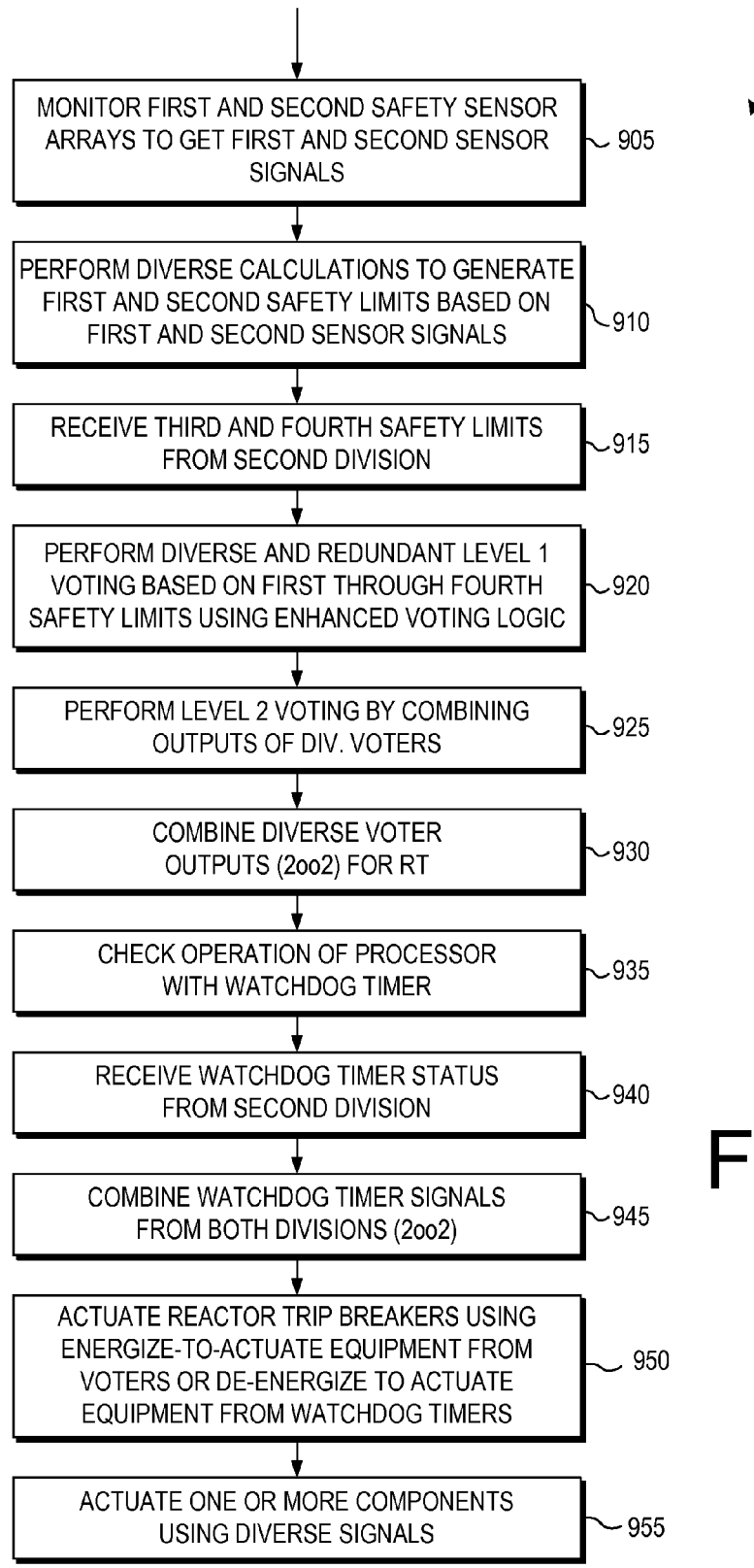
FIG. 9 is a flow chart showing the general operation of a first safety division in a two-division nuclear power plant safety system, according to disclosed embodiments.

FIG. 9 is a flow chart showing the general operation of a first safety division 110 in a two-division nuclear power plant safety system 100, according to disclosed embodiments. As shown in FIG. 9, the operation of the first safety division 110 begins by having the first safety division 110 monitor first and second safety sensor arrays 180, 183 to get first and second sensor signals (905).

The first safety division 110 then performs diverse calculations to generate first and second safety limits (i.e., first and second calculation results) based on the first and second sensor signals (910). As noted above, the first and second safety limits may be signals that indicate whether or not the first and second sensor signals meet or exceed set safety thresholds.

The first safety division 110 then receives third and fourth safety limits (i.e., third and fourth calculation results) from the second safety division 115 (915).

The first safety division 110 performs diverse and redundant level 1 voting based on the first through fourth safety limits using enhanced voting logic (920).

The first safety division 110 then performs level 2 voting by combining outputs of diverse voters (925) using 2oo2 logic for ESF actuation.

The first safety division 110 then combines diverse voter outputs using wired 2oo2 voting logic for RT (930) actuation.

The first safety division 110 then checks the operation of the processor with a watchdog timer (935).

After this, the first safety division 110 receives watchdog timer status from the second division 115 (940).

The first and second watchdog timer signals from the two divisions 110, 115 are then combined using 2oo2 voting (945).

The first safety division 110 actuates reactor trip breakers using energize-to-actuate equipment from voters, or de-energize to actuate equipment from watchdog timers (950).

Finally, the first safety division 110 then may actuate one or more ESF components [combining diverse signals is explained in line, i.e., more than one signal passed along more than one signal path (955).

Although FIG. 9 discusses the operation of the first safety division 110, these operations are equally applicable to the second safety division 115. In that case, the second safety division 115 monitors the third and fourth safety sensor arrays 186, 189, and receives the first and second safety limits from the first safety division 110.

Method of Operation of Diagnostic Logic for a Division

Figure 10:
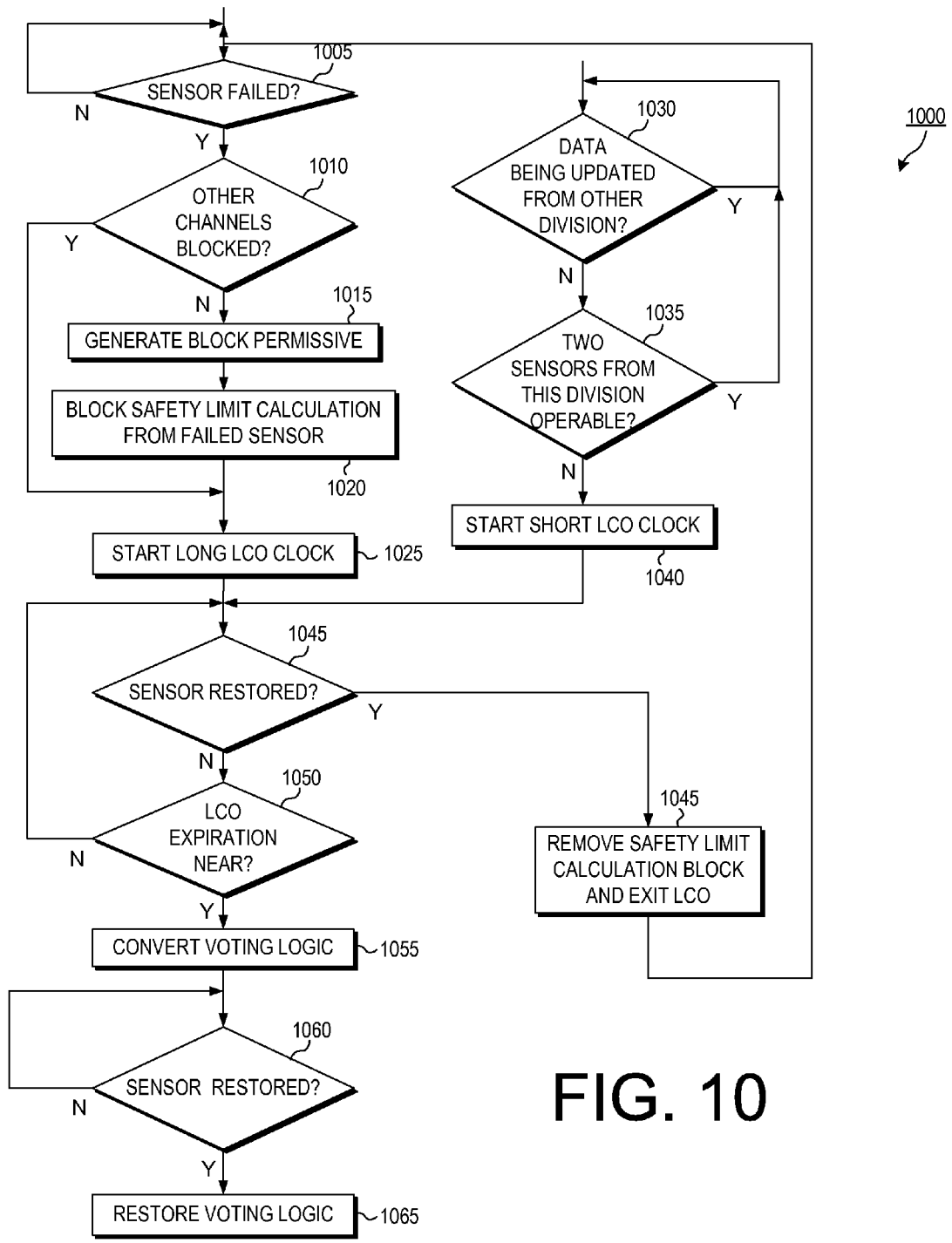
FIG. 10 is a flow chart showing the diagnostic logic performed by one of the divisions according to disclosed embodiments.

FIG. 10 is a flow chart showing the diagnostic logic performed by one of the divisions 110, 115 according to disclosed embodiments. As shown in FIG. 10, three separate diagnostic processes are performed in parallel. First a determination of sensor operation is determined (1005-1020); second a determination of data transmission operation is determined (1025-1030); and third a determination of whether sensor operation is restored (1035-1065).

As noted above, first a determination is made as to whether a sensor has failed (1005). This determination can be made by periodic check/test, out-of-range alarm, erroneous partial trip signal, or the like, and various embodiments. If no sensor has failed, then the sensor operation diagnostic process returns to start and continues to check for sensor failure until such a failure is determined.

If, however, a sensor failure is detected, the system will automatically determine whether any other channels for the same safety limit calculation are already blocked (1010).

If no other channels are blocked, the system will automatically generate a block permissive (1015) allowing the operator to block the safety limit calculation from the failed sensor (1020). This is so that there is no interface to voters in any division. In one embodiment, this can be accomplished by forcing the output of the failed sensor to a LOW value, despite what the sensor might otherwise indicate. Then, the plant operator starts the LCO clock (1035) and enters into an LCO state.

If, however, the system determines that other channels are blocked when the sensor fails, then the operator cannot block the safety limit calculation from the failed sensor and the operator immediately starts a long LCO clock (1025) and enters into a long-duration LCO state.

In parallel with this sensor operation determination, the system also performs the data transmission operation determination. In particular, the system determines whether data is being updated to the current division 110, 115 from the other division 110, 115. (1030) if data is being updated, then the system determines that everything is working properly, and simply returns to determining whether data is being updated from the other division until it determines that it is not.

If, however, the system determines the data is not properly being updated from the other division then the operator determines whether the two sensors connected to the current division 110, 115 are operable (1035). If both sensors connected to the current division 110, 115 are operable, than there is no need to enter into an LCO. As a result, the system then returns to determining whether data is being updated from the other division 110, 115.

If, however, the system determines that the two sensors from the current division for the same safety limit calculation 110, 115 are not both operable, then the operator starts a short LCO clock (1040) and enters into a short-duration LCO state.

Thus, the operator will enter into an LCO state when there is a failed sensor; and the LCO time duration will depend on the operability of other sensors for the same safety limit calculation and the operability of the data transmission path.

Once the LCO clock has been started (1025, 1040), the operator then begins to determine whether the failed sensor has been restored to service. (1045). The LCO clock will use the shortest duration if multiple durations are set.

If the sensor has been restored to service, then the operator removes the safety limit calculation block and exits the LCO associated with that sensor failure (1045).

If, however, the sensor has not been restored to service, then the operator determines whether the expiration of the LCO time is approaching (1050).

If the expiration of the LCO time is not approaching, then the operator continues to determine whether the sensor has been restored to service (1045).

If, however, the expiration of the LCO time is approaching, then the operator converts the voting logic of the division enhanced voting logic in the current division 110, 115 to bring the system into SFC compliance using only the operable safety limit calculation channels, and then exits the LCO. This conversion of the voting logic can include moving to as simple as a 1oot voting configuration.

Once the voting logic has been converted, the operator then again begins to determine whether the sensor has been restored to service (1060). However, this time the system is not in an LCO state, and so there is no time pressure on the system to get the sensor back into service.

As a result, if the sensor is determined to not be back in service, the system simply continues to check whether the sensor has been restored to service (1060) until the answer is yes.

Once the sensor has been restored to service, the operator then restores the voting logic of the division enhancing voting logic 126, 136 of the current division 110, 115 (1065).

In this way, the safety system 100 can maintain operation of the nuclear power plant without having to shut down.

Diverse Signal Processing (with 2oo2 Output Voting)

This section explains diverse 2oo4 and signal output processing. This simply exemplifies diverse signal processing methods. Diverse signal processing is also applied for the two safety limit calculations within the same RPP.

While the level 1 voting logic described above prevents spurious actuation due to measurement channel failures and data links failures (as described above and shown in FIGS. 2A through 7B), it does not prevent spurious actuation of a division 110, 115 due to a failure within the division's safety system digital processors. These spurious actuations can occur due to rare, but possible, memory errors or failures in processor outputs. These rare failures are ultimately detectable by self-diagnostics, but not immediately detectable, and, therefore, can result in spurious actuation.

The disclosed system and method minimizes the potential for a spurious actuation from the processors within a division 110, In other words the potential problem of spurious actuation is eliminated at its source. This is accomplished by employing two diverse signal processing paths that result in two separate protection action safety demand outputs from each safety division. The two outputs from the processor are then combined using 2oo2 logic to create the final protective action safety demand output from the division. The 2oo2 logic can, for example, be implemented using wired AND logic or an actual AND gate. Therefore, both diverse processing sections within the division must actuate for the division to generate a protective action.

The function processing diversity described above is achieved by using different logic function blocks. For example, a 2oo4 function block is used for one of the two diverse voting methods, and a combination of standard discrete logic function blocks (e.g. AND/OR gates) is used to create the second diverse 2oo4 voting method. Similarly to implement diverse time delays, on-delay timers are used for one of the two diverse methods and inverted signals with off-delay timers used for the second diverse method. This use of different standard function blocks ensures that a single failure (e.g., memory bit failure) that causes a standard function block to generate an erroneous output, cannot cause spurious actuation in all signal processing that utilizes that failed function block.

Figure 11:
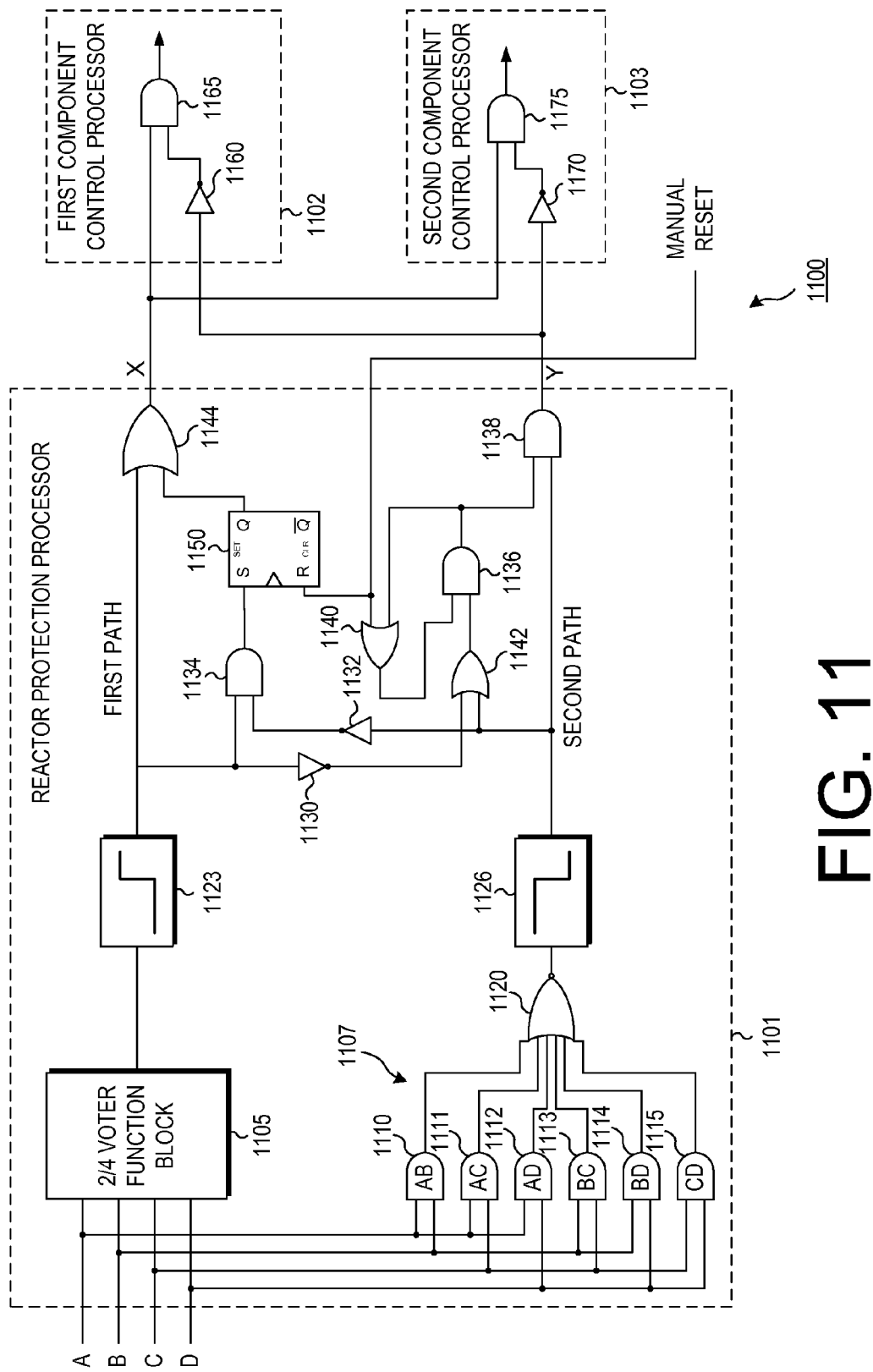
FIG. 11 is a block diagram of a diverse ESF actuation processing circuit, according to disclosed embodiments.

FIG. 11 is a block diagram of a diverse ESF actuation processing circuit 1100, according to disclosed embodiments. As shown in FIG. 11, the ESF actuation processing circuit 1100 includes a reactor protection processor (RPP) 1101, a first component control processor (CCP) 1102, and a second CCP 1103. The RPP 1101 includes a two-of-four voter function block 1105, two-of-four voting logic 1107, an on-delay timer 1123, an off-delay timer 1126, first and second inverters 1130, 1132, first through third AND gates 1134, 1136, 1138, first through third OR gates 1140, 1142, 1144, and a Q flip-flop 1150. The two-of-four voting logic 1107 includes fourth through ninth AND gates 1110, 1111, 1112, 1113, 1114, 1115, and NOR gate 1120. The first CCP 1102 includes a third inverter 1160, and a tenth AND gate 1165. The second CCP 1103 includes a fourth inverter 1170, and an eleventh AND gate 1175.

The RPP 1101 operates to take four A, B, C, D calculation results from a calculation module 120, 130 and perform 2oo4 voting twice with respect to those signals to generate two diverse signals X, Y indicating whether these calculation results together instruct the safety system 100 to take safety action (e.g., ESF or RT). In some embodiments, the diverse signals X, Y will have the same orientation (e.g., HIGH indicates safety action should be taken, and LOW indicates that no safety action need be taken, or vice versa). In other embodiments, the diverse signals X, Y will have opposite orientations (e.g., for one signal HIGH indicates safety action should be taken and LOW indicates that no safety action need be taken, while for the other signal LOW indicates safety action should be taken and HIGH indicates that no safety action need be taken, or vice versa). The embodiment of FIG. 11 has the two resulting diverse signals X, Y having opposite orientations. However, this is by way of example only. Alternate embodiments could employ different signal orientations.

The first CCP 1102 receives the diverse signals X, Y and uses them together to determine whether a first component should take safety action. In particular, the first CCP 1102 generates a signal indicating that safety action should be taken by the first component only if both of the diverse signals X, Y indicate that safety action should be taken.

Likewise, the second CCP 1103 also receives the diverse signals X, Y and uses them together to determine whether a second component should take safety action. In particular, the second CCP 1103 generates a signal indicating that safety action should be taken by the second component only if both of the diverse signals X, Y indicate that safety action should be taken.

The two-of-four voter function block 1105 receives the signals A, B, C, D and performs a 2oo4 voting operation on these four signals. In particular, the two-of-four voter function block 1105 generates a signal indicating that safety action should be taken only when two out of the four inputs signals A, B, C, D indicate that safety action should be taken.

Likewise, the two-of-four voting logic 1107 also receives the signals A, B, C, D and performs a 2oo4 voting operation on these four signals. In particular, the two-of-four voter logic 1107 generates a signal indicating that safety action should be taken only when two out of the four inputs signals A, B, C, D indicate that safety action should be taken.

Although it is possible that the two-of-four voter function block 1105 and the two-of-four voting logic 1107 could be implemented using similar circuitry, in the disclosed embodiment, these two circuits are implemented differently. In particular, the two-of-four voter function block 1105 uses 'C' language software programming, while the two-of-four voting logic 1107 uses AND and NOR gates.

The fourth through ninth AND gates 1110, 1111, 1112, 1113, 1114, 1115 each receive two of the four inputs signals A, B, C, D and perform an AND operation on the signal pairs. The results of these AND operations are then provided to the NOR gate 1120, which produces a signal that indicates whether safety action should be taken using an opposite orientation from how the two-of-four voter function block 1105 makes the same indication.

In other words, in this embodiment, a HIGH result from the two-of-four voter function block 11 of five indicates that safety action should be taken, while a LOW result from the two-of-four voting logic 1107 (i.e., output from the NOR gate 1120) indicates that safety action should be taken.

The on-delay timer 1123 operates to delay the output of the two-of-four voter function block 1105 from rising to a HIGH level, while the off-delay timer 1126 operates to delay the output of the two-of-four voting logic 1107 from dropping to a LOW level. The output of the on-delay timer 1123 can be considered a first path, while the output of the off-delay timer 1126 can be considered a second path.

As shown in the following paragraphs, gates 1132, 1134, 1144, and flip-flop 1150 propagate and latch the HIGH 2oo4 voting result, while gates 1130, 1142, 1136, 1140 and 1138 latch and propagate the LOW 2oo4 voting result. The diverse HIGH and LOW signals (each having the same actuation or non-actuation meaning) are combined in the CPPs. The inverters in the CPPs are provided only to allow the two diverse signals to be combined. Diverse processing is not needed in the CPPs because spurious actuation of single CPP is tolerated by dividing the plant components among the CPPs and thereby limiting the number of plant components that can be spuriously actuated by a single CPP. The different CPPs do not share processing CPUs or memory, therefore a single failure of a function block will only affect the plant components controlled by one CPP.

The first inverter 1130 is connected between the output of the on-delay timer 1123 and an input of the second OR gate 1142.

The second inverter 1132 is connected between the output of the off-delay timer 1126 and an input of the first AND gate 1134.

The first AND gate 1134 receives the output of the on-delay timer 1123 and the inverted output of the off-delay timer 1126 (from the second inverter 1132) and performs an AND operation on these two signals.

The second AND gate 1136 receives the output of the first OR gate 1140 and the second OR gate 1142, and performs an AND operation on these two signals.

The third AND gate 1138 receives the output of the off-delay timer 1126 and the output of the second AND gave 1136 and performs an AND operation on these two signals to generate the output signal Y.

The first OR gate 1140 receives the output of the second AND gate 1136 and a manual reset signal, and performs an OR operation on these two signals.

The second OR gate 1142 receives the output of the off-delay timer 1126 and the inverted output of the on-delay timer 1123 (from the first inverter 1130) and performs an AND operation on these two signals.

The third OR gate 1144 receives the output of the on-delay timer 1123 and the output of the Q flip-flop 1150, and performs an OR operation on these two signals to generate the output signal X.

The Q flip-flop 1150 receives the output of the first AND gave 1134 as its set input, and the manual reset as its reset input. It provides a Q signal to the third OR gate 1144

The third inverter 1160 receives the output signal Y, inverts it, and provides the inverted signal to the tenth AND gate 1165.

The tenth AND gate 1165 receives the output signal X and an inverted version of the output signal Y and performs an AND operation on them to generate a first component control signal.

The fourth inverter 1170 receives the output signal X, inverts it, and provides the inverted signal to the eleventh AND gate 1175.

The eleventh AND gate 1175 receives the output signal Y and inverted version of the output signal X and performs in AND operation on them to generate a second component control signal.

In FIG. 11, the two diverse outputs from the first division 110 level 1 reactor protection processor (RPP) are combined using an AND gate 1165, 1175 (2oo2 logic) that resides in multiple first division 110 level 2 component control processors (CCPs) 1102 and 1103. Therefore, the CCPs will respond only if both diverse protective action safety demand signals are generated by the RPP. As a result, spurious actuation of multiple CCPs is prevented without the conventional method of employing an additional layer of 2oo4 voting using signals from four safety divisions.

This diverse processing scheme within the RPP is applied even though a spurious action due to a failure within the safety processor is unlikely due to the rare nature of failures that are not immediately detectable by self-diagnostics. In addition, this scheme is not applied to all RPP processor application functions. It is only applied when a spurious output results in a plant upset. For example, diverse logic is not applied to operating bypasses, maintenance bypasses, indications, or alarms; but it is applied to reactor trip, main steam isolation, main feedwater isolation, containment isolation, and containment spray.

A similar configuration is employed for RT, where the two output signals from the diverse RPP signal processing are combined using wired AND logic prior to interfacing to the corresponding RTB undervoltage (UV) and shunt trip (ST) coils for that division.

Methods of Performing Diverse Signal Processing

Figures 12, 13:
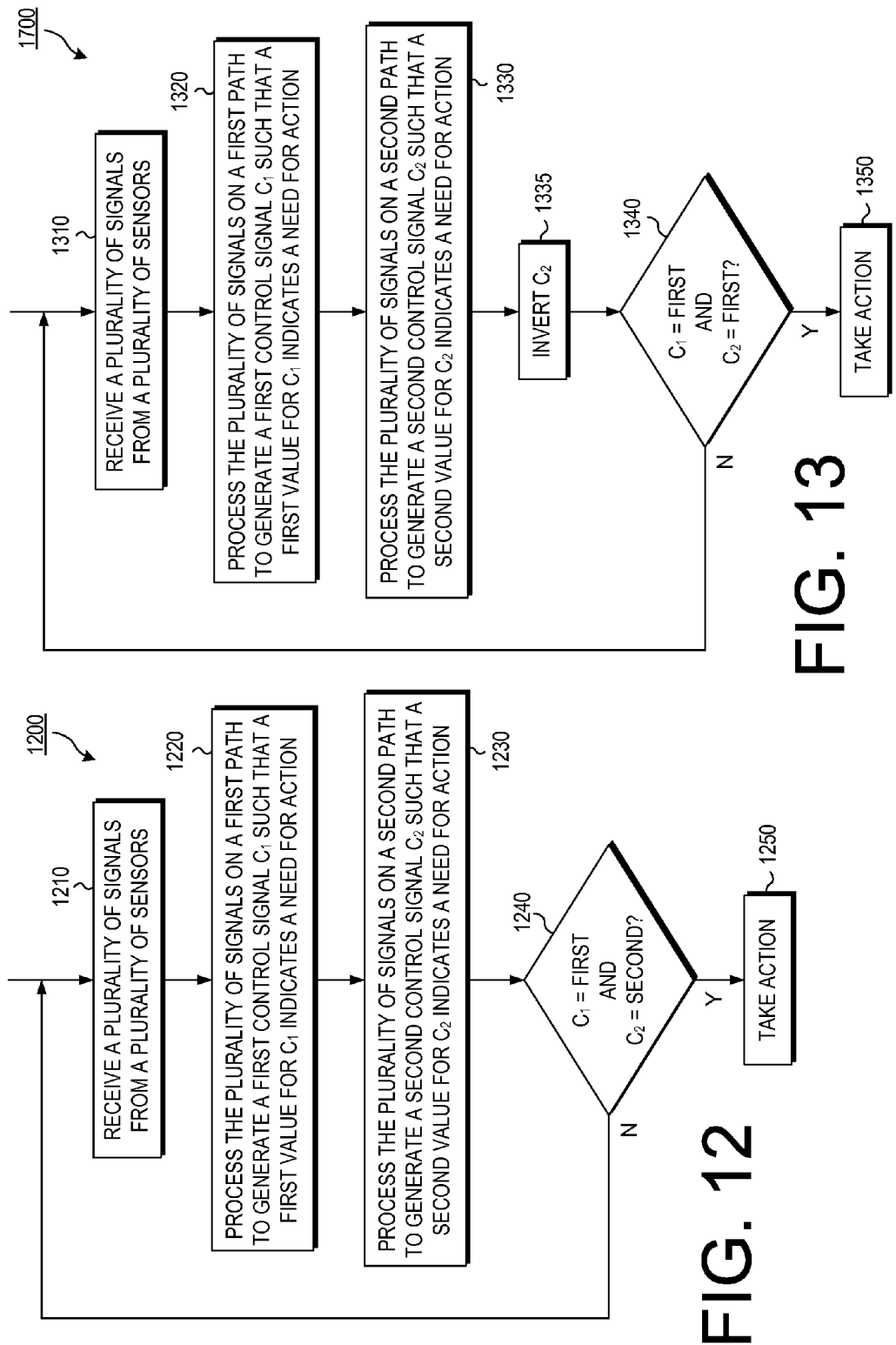
FIG. 12 is a flow chart showing the performance of diverse signal processing using two signal paths that employ different function blocks to implement the same logic, according to disclosed embodiments.
FIG. 13 is a flow chart showing the performance of diverse signal processing using one non-inverted signal path and one inverted signal path, according to disclosed embodiments.

FIGS. 12 and 13 are flowcharts showing the performance of diverse signal processing, according to disclosed embodiments. In particular, FIG. 12 is a flow chart showing the performance of diverse signal processing using two signal paths that employ different function blocks to implement the same logic, according to disclosed embodiments, while FIG. 13 is a flow chart showing the performance of diverse signal processing using one non-inverted signal path and one inverted signal path, according to disclosed embodiments.

As shown in FIG. 12, this disclosed process can begin when a system receives a plurality of signals from a plurality of sensors (1210).

The system then processes the plurality of signals on a first path to generate a first control signal $C_1$ such that a first value for $C_1$ indicates a need for action (1220). For example, this first value could be a HIGH value or in LOW value.

The system then processes the plurality of signals on a second path using different function blocks to generate a second control signal $C_2$ such that a second value for $C_2$ indicates a need for safety action (1230). For example, the second value could be the inverse of the first value. In other words, if the first value was HIGH, the second value would be LOW, or if the first value was LOW, the second value would be HIGH in FIG. 11 the 2oo4 voting is implemented with a single function block and diversely with multiple discrete logic gates.

The system then examines $C_1$ and $C_2$ to determine if $C_1$ has the first value and $C_2$ has the second value (1240). If this is the case, then the system takes appropriate safety action (1250). If, however, either $C_1$ does not have the first value or $C_2$ does not have the second value, then the system does nothing and returns to receiving the plurality of signals from the plurality of sensors (1210).

As shown in FIG. 13, this disclosed process can also begin when a system receives a plurality of signals from a plurality of sensors (1310).

The system then processes the plurality of signals on a first path to generate a first control signal $C_1$ such that a first value for $C_1$ indicates a need for action (1320). For example, this first value could be a HIGH value or a LOW value.

The system then inverts the plurality of signals and processes the inverted signals using diverse function blocks from the first path on a second path to generate a second control signal $C_2$ such that a second value for $C_2$ indicates a need for safety action (1330). For example, the second value could be the inverse of the first value. In other words, if the first value was HIGH, the second value would be LOW, or if the first value was LOW, the second value would be HIGH. In FIG. 11, the outputs from blocks 1105 and 1120 have the same meaning but are inverted. The subsequent logic processes those inverted signals to achieve the same logic algorithm but using different function blocks because the signals are inverted.

In this embodiment, the system then inverts $C_2$ (1335), and examines $C_1$ and the newly inverted $C_2$ to determine if $C_1$ and C2 both have the first value (1340). If this is the case, then the system takes appropriate safety action (1350). If, however, either $C_1$ or $C_2$ does not have the first value, then the system does nothing and returns to receiving the plurality of signals from the plurality of sensors (1310).

By using two independently generated and diverse signals, the safety system can avoid a spurious result instructing that safety action be taken based on an error in only one of the signal paths Energize to Actuate Fail-Safe Design The potential for spurious actuation, and therefore the threat to plant availability, is increased by the requirement from General Design Criterion (GDC) 23 for fail-safe RT actuation. This means that if there is a complete safety system failure, either due to loss of power or failure of the processors, protective action safety demand signals will be generated to the RTB. Preventing spurious actuation is especially important for the two safety division design, since the RTBs for the two divisions are arranged so that the protective action can be actuated by either division, as previously noted.

Figure 14:
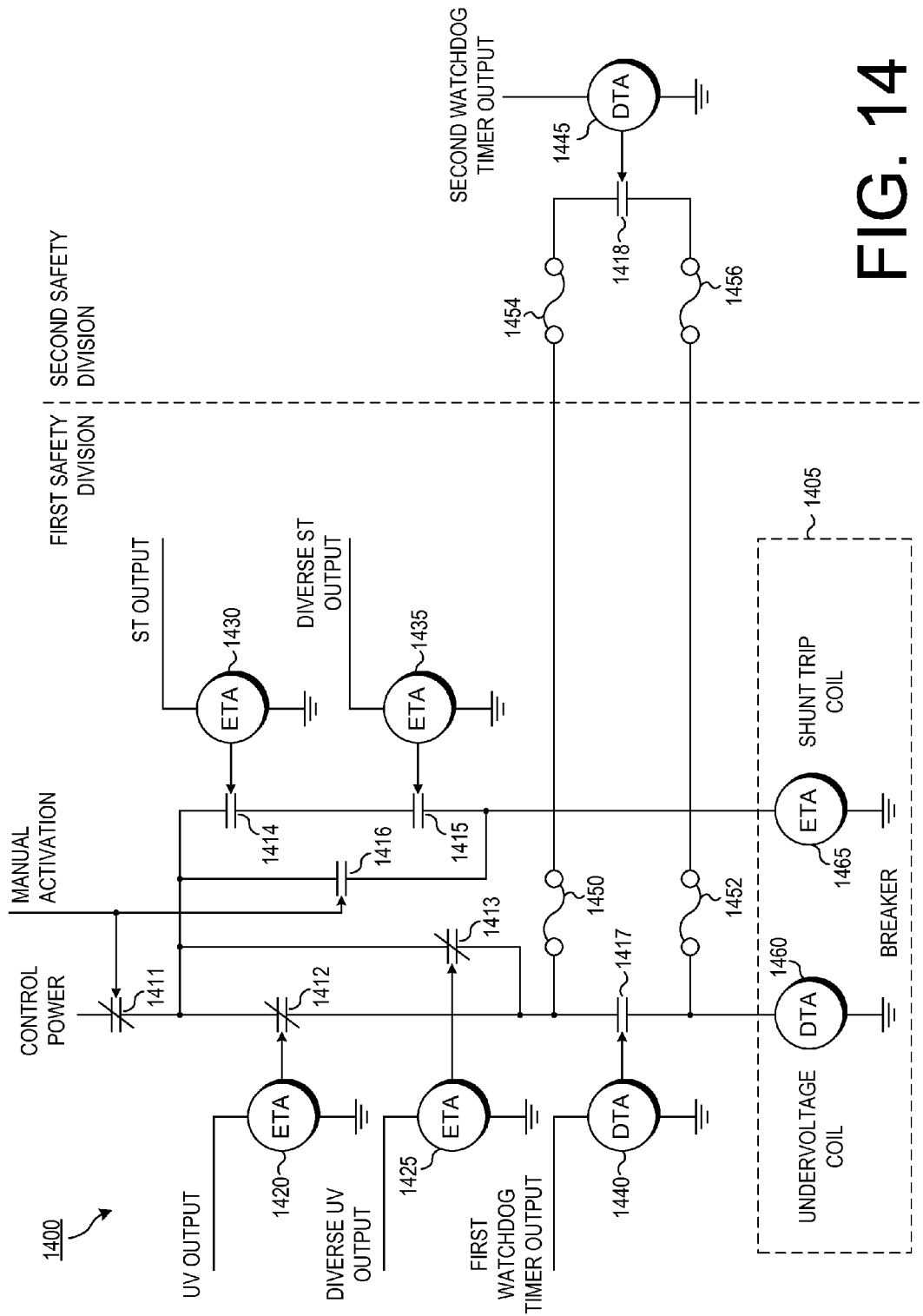
FIG. 14 is a circuit diagram showing an RPP to RTB interface for one division, including inter-division isolation, according to disclosed embodiments.

FIG. 14 is a circuit diagram showing an RPP to RTB interface for one division, including inter-division isolation, according to disclosed embodiments. This drawing is representative of all four RTBs in the safety system (two in each division). Prevention of spurious RT due to processor failure in one division and compliance with the fail-safe criterion of GDC 23, are both accommodated by the following design features:

As shown in FIG. 14, the energize-to-actuate fail safe design includes a breaker 1405, first through eighth switches 1411-1418, an undervoltage control circuit 1420, a diverse undervoltage control circuit 1425, a shunt trip control circuit 1430, a diverse shunt trip control circuit 1435, a first division watchdog timer control circuit 1440, a second division watchdog timer control circuit 1445, and first through fourth fuses 1450, 1452, 1454, 1456. The breaker 1405 further includes an undervoltage coil 1460 and a shunt trip coil 1465.

The breaker 1405 serves to control the shutdown of the nuclear power plant. When either the undervoltage coil 1460 is de-energized or the shunt trip coil 1465 is energized, the breaker opens removing power to the nuclear reactor control rods. When the control rods lose power the fall into the reactor by gravity and the nuclear power plant enters into a shutdown mode.

The first switch 1411 is located between a first control power and a first node, and is controlled by a manual activation signal.

The second switch 1412 is located between the first node and a second node, and is controlled by an undervoltage control signal generated by the undervoltage control circuit 1420.

The third switch 1413 is located between the first node and the second node, in parallel with the second switch 1412, and is controlled by a diverse undervoltage control signal generated by the diverse undervoltage control circuit 1425.

The fourth switch 1414 is located between the first node and a third node, and is controlled by a shunt trip control signal generated by the shunt trip control circuit 1430.

The fifth switch 1415 is located between the third node and the shunt trip coil 1465, and is controlled by a diverse shunt trip control signal generated by the diverse shunt trip control circuit 1435.

The sixth switch 1416 is located between the first node and the shunt trip coil 1465, and is controlled by the manual activation signal.

The seventh switch 1417 is located between the second node and the undervoltage coil 1460, and is controlled by the first division watchdog timer control circuit 1440.

The eighth switch 1418 is located between a fourth node and a fifth node, and is controlled by the second division watchdog timer control circuit 1445.

The first, second, and third switches 1411, 1412, 1413 are closed by default (i.e., they are closed when their control relays receive a LOW signal indicating no need for RT), while the fourth through eighth switches 1414, 1415, 1416, 1417, 1418 are all open by default (i.e., they are open when their control relays receive a LOW signal indicating no need for RT).

The breaker 1405, the first through seventh switches 1411-1417, the undervoltage control circuit 1420, the diverse undervoltage control circuit 1425, the shunt trip control circuit 1430, the diverse shunt trip control circuit 1435, the first division watchdog timer control circuit 1440, and the first and second fuses 1450, 1452 are all located in the first division 110. The eighth switch 1418, the second division watchdog timer control circuit 1445, and the third and fourth fuses 1454, 1456 are all located in the second division 115.

The undervoltage control circuit 1420 provides an undervoltage control signal to control the operation of the second switch 1412. The undervoltage control circuit 1420 is an energize-to-actuate circuit that provides a HIGH signal to the second switch 1412 when an undervoltage output is HIGH, indicating a need for RT.

The diverse undervoltage control circuit 1425 provides a diverse undervoltage control signal to control the operation of the third switch 1413. The diverse undervoltage control circuit 1425 is an energize-to-actuate circuit that provides a HIGH signal to the third switch 1413 when a diverse undervoltage output is HIGH, indicating a need for RT. The undervoltage control signal and the diverse undervoltage control signal are the same general signal generated to control operation of the undervoltage coil via two separate signal paths.

The shunt trip control circuit 1430 provides a shunt trip control signal to control the operation of the fourth switch 1414. The shunt trip control circuit 1430 is an energize-to-actuate circuit that provides a HIGH signal to the fourth switch 1414 when a shunt trip output is HIGH, indicating a need for RT.

The diverse shunt trip control circuit 1435 provides a diverse shunt trip control signal to control the operation of the fifth switch 1415. The diverse shunt trip control circuit 1435 is an energize-to-actuate circuit that provides a HIGH signal to the fifth switch 1415 when a diverse shunt trip output is HIGH, indicating a need for RT. The shunt trip control signal and the diverse shunt trip control signal are the same general signal generated to control operation of the shunt trip coil via two separate signal paths.

The first division watchdog timer control circuit 1440 provides a first watchdog signal to control the operation of the seventh switch 1417. The first division watchdog timer control circuit 1440 is a de-energize-to-actuate circuit that provides a LOW signal to the seventh switch 1417 when a first watchdog timer output is LOW, indicating the need for RT.

The second division watchdog timer control circuit 1445 provides a second watchdog signal to control the operation of the eighth switch 1418. The second division watchdog timer control circuit 1445 is a de-energize-to-actuate circuit that provides a LOW signal to the eighth switch 1418 when a second watchdog timer output is LOW, indicating the need for RT.

The electromagnetic isolation between relay 1440 and contact 1417, and between relay 1445 and contact 1418 prevent the propagation of common mode electrical faults between the first and second safety divisions that could otherwise result in failure of both divisions. The first through fourth fuses 1450, 1452, 1454, 1456 serve to prevent undue amounts of current between the seventh switch 1417 and the eighth switch 1418. This prevents the propagation of transverse mode electrical faults between the first and second safety divisions that could otherwise result in failure of both divisions.

The undervoltage coil 1460 is a de-energize-to-actuate circuit that is connected to the control power via the first, second, third, and seventh switches 1411, 1412, 1413, 1470. So long as power is being supplied to the undervoltage coil 1460, it will not actuate to cause a plant shutdown. Once power is removed from the undervoltage coil 1460, however, it will actuate and cause plant shutdown.

The undervoltage coil 1460 can be cut off from the control power (and thus actuated) when one of three situations occurs: (1) the manual activation signal opens the first switch 1411; (2) the undervoltage control circuit 1420 opens the second switch 1412 and the diverse undervoltage control circuit 1425 opens the third switch 1413; or (3) the first division watchdog timer control circuit 1440 opens the seventh switch 1417 and the second division watchdog timer control circuit 1445 opens the eighth switch 1418.

The shunt trip coil 1465 is an energize-to-actuate circuit that is connected to the control power via the fourth, fifth, and sixth switches 1414, 1415, 1416. So long as no power is being supplied to the shunt trip coil 1465, it will not actuate to cause a plant shutdown. Once power is supplied to the shunt trip coil 1465, however, it will actuate and cause a plant shutdown.

Power loss is prevented by powering each safety division 110, 115 from two power sources with redundant power supplies in each safety division 110, 115.

Energize-to-actuate signals are employed for the protective action safety demand signal to the undervoltage (UV) and shunt trip (ST) coils of the RTBs. This ensures that there is no spurious actuation of the RTBs in that division when there is an RPP failure. Therefore, there is no spurious reactor trip.

Watchdog timer outputs from the RPPs of both divisions 110, 115 are combined in a 2-out-of-2 configuration to trip all RTBs 1405 via their UV trip mechanisms. This ensures that if there is a complete failure of the RPPs in both divisions 110, 115, all RTBs 1405 will be actuated to ensure a reactor trip. Although each safety division is not individually configured for fail-safe operation, ensuring a reactor trip for a failure of both safety divisions, complies with GDC 23.

As shown in FIG. 14, each RTB has an ST trip mechanism 1465 and a UV trip mechanism 1460. FIG. 14 also shows the relays that interface between RPP controllers and the ST and UV mechanisms. These relays are an integral part of the controller (e.g., DO modules and WDT output).

During normal operation, the RTB is closed. The UV coil 1440 of the breaker 1405 is energized by power continuity through the two RPP UV relay outputs (normally de-energized, energize-to-actuate) and the two RPP watchdog timer (WDT) outputs (normally energized, de-energize-to-actuate). Actuating either the two UV outputs or the two WDT outputs will remove power to the UV coil causing the RTB to open. For periodic surveillance testing, all outputs can be actuated separately and in pairs.

To meet RG 1.75 and IEEE-384 for electrical independence, circuits between divisions 110, 115 need to accommodate both common mode and transverse mode faults. The relays provide coil-to-contact isolation to ensure a common mode fault cannot propagate between divisions. However, relays alone don't protect against transverse mode faults. Without current limiting or circuit interruption, a transverse mode fault causes high current, which results in overheating and possibly fire. So fuses are provided that interrupt the current to prevent overheating. Double fusing (i.e., fuses in both divisions, such as fuses 1460, 1462, 1464, 1466) is the industry accepted method.

Manual reactor trip is implemented by hardwired connections directly from main control room (MCR) switches to the RTB. There is one RT switch for each RTB. Reactor trip is actuated by activating two switches in either division (e.g., switches 1451 and 1454. Each switch provides a normally closed contact for the UV coil circuit 1440 and a normally open contact for the ST coil circuit 1450. Depressing the switch, while it is in the normal/center position, activates both contacts; rotating the switch left/right and depressing the switch activates only one contact to allow separate UV and ST periodic surveillance testing.

Method of Operation of Watchdog Timer Circuits

Figures 15, 16:
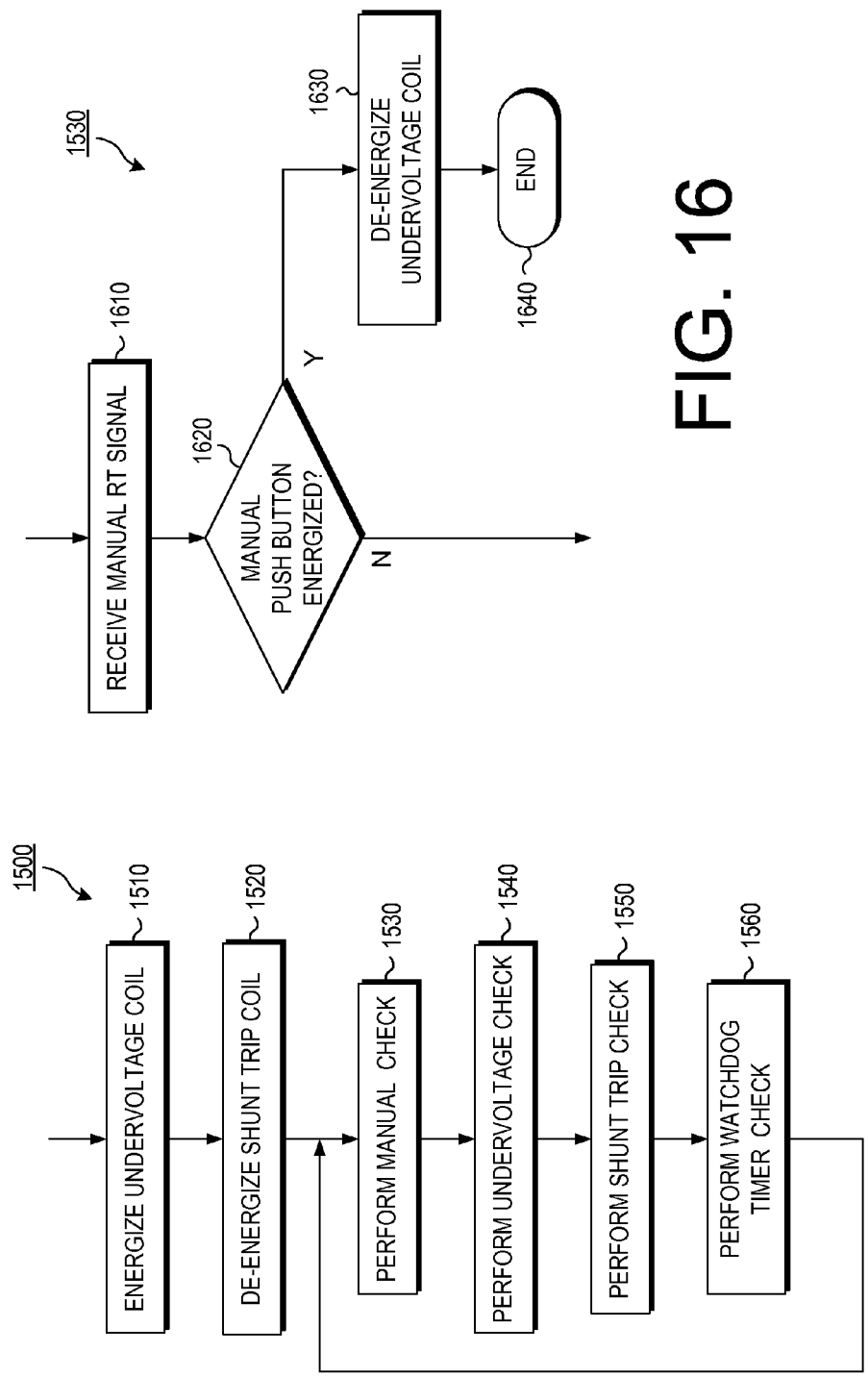
FIG. 15 is a flow chart showing the general operation of the circuit of FIG. 14, according to disclosed embodiments.
FIG. 16 is a flow chart showing operation of performing a manual check of FIG. 15, according to disclosed embodiments.

FIG. 15 is a flow chart showing the general operation of the circuit of FIG. 14, according to disclosed embodiments. As shown in FIG. 15, operation begins by energizing the undervoltage coil 1460 (1510), and de-energizing the shunt trip coil 1465 (1520).

Once this is done, the safety system then performs a manual check as to whether manual activation has been actuated causing the RTB to open and starting reactor shutdown (1530), performs an undervoltage check to determine whether the undervoltage coil 1460 has been actuated, causing RTB opening and starting reactor shutdown (1540), performs a shunt trip check to determine whether the shunt trip coil 1465 has been actuated, causing RTB opening and starting reactor shutdown (1550), and performs a watchdog timer check to determine whether the watchdog timer control signals in both the first and second divisions 110, 115 has been activated, causing RTB opening and starting reactor shutdown. These checking operations (1530, 1540, 1550, 1560) are repeatedly performed during system operation.

Although FIG. 15 shows that the performance of a manual check (1530), the performance of an undervoltage check (1540), the performance of a shunt trip check (1550), and the performance of a watchdog timer check (1560) are performed in series, these operations are typically performed in parallel. Therefore, no particular order should be assumed based on the order in which these operations are shown in FIG. 15, and these operations can be performed in parallel.

FIG. 16 is a flow chart showing operation of performing a manual check (1530) of FIG. 15, according to disclosed embodiments. As shown in FIG. 16, the operation begins by receiving a manual RT signal (1610). This manual RT signal can either indicate that no RT is required (the manual pushbutton is not energized), or it can indicate that an RT is required (the manual pushbutton is energized).

As result, the system then determines whether the manual pushbutton is energized, indicating that an RT is required (1620).

If the manual pushbutton is not energized, then processing continues without any further action being taken. If, however the manual pushbutton is energized, then the system de-energizes the undervoltage coil (1630), causing the RTB to open and shutdown of the nuclear reactor. Processing then ends (1640).

In alternate embodiments, it is also possible that when the manual pushbutton is energized, it will energize the shunt trip coil at the same time that it de-energizes of the undervoltage coil. This provides greater security that system shutdown will occur.

Figure 17:
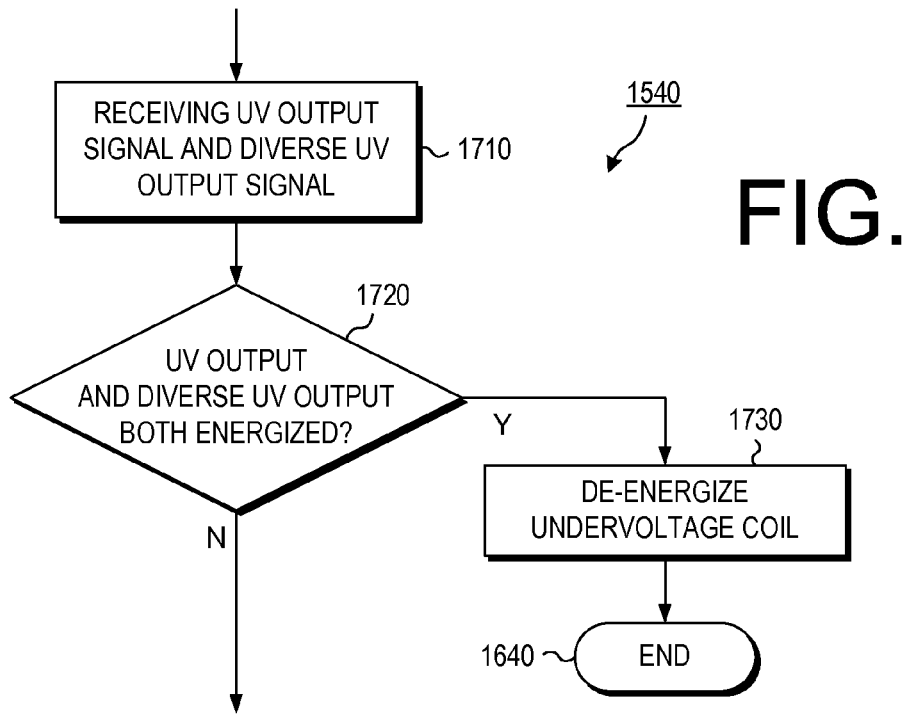
FIG. 17 is a flow chart showing operation of performing an undervoltage check of FIG. 15, according to disclosed embodiments.

FIG. 17 is a flow chart showing operation of performing an undervoltage check (1540) of FIG. 15, according to disclosed embodiments. As shown in FIG. 17, the operation begins by receiving both an undervoltage output signal and a diverse undervoltage output signal (1710). These two signals are the same general signal, but are processed along different signal paths.

The system then determines whether the undervoltage output and the diverse undervoltage output are both energized, i.e. whether they both indicate that the undervoltage coil should be de-energized (1720).

If one or both of the undervoltage output and the diverse undervoltage output signals are not energized, then processing continues without any further action being taken.

If, however both the undervoltage output and the diverse undervoltage output are energized, then the system de-energizes the undervoltage coil, opening the RTB and starting shutdown of the nuclear reactor (1730). Processing then ends (1640).

Figure 18:
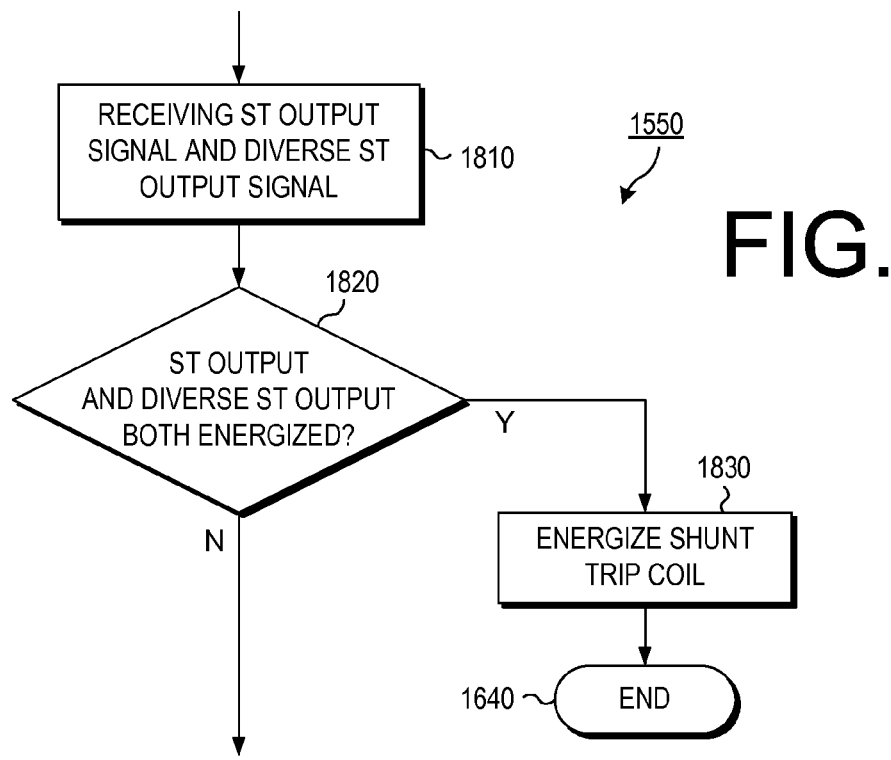
FIG. 18 is a flow chart showing operation of performing a shunt trip check of FIG. 15, according to disclosed embodiments.

FIG. 18 is a flow chart showing operation of performing a shunt trip check (1550) of FIG. 15, according to disclosed embodiments. As shown in FIG. 18, the operation begins by receiving both shunt trip output signal and a diverse shunt trip output signal (1810). These two signals are the same general signal, but are processed along different signal paths.

The system then determines whether the shunt trip output and the diverse shunt trip output are both energized, i.e. whether they both indicate that the shunt trip coil should be energized (1820).

If one or both of the shunt trip output and the diverse shunt trip output signals are not energized, then processing continues without any further action being taken.

If, however both the shunt trip output and the diverse shunt trip output are energized, then the system energizes the shunt trip coil, opening the RTB and starting shutdown of the nuclear reactor (1830). Processing then ends (1640).

Figure 19:
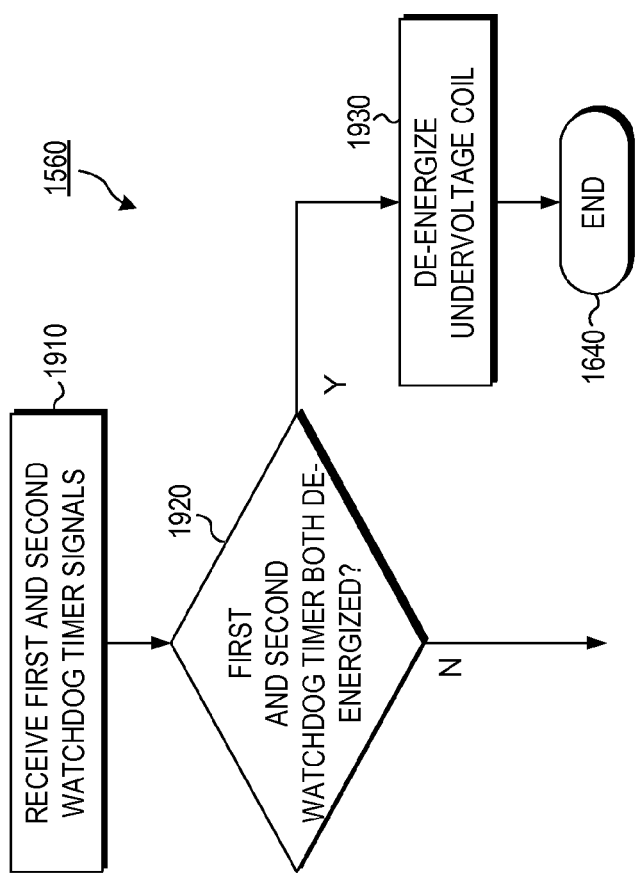
FIG. 19 is a flow chart showing operation of performing a watchdog timer check of FIG. 15, according to disclosed embodiments.

FIG. 19 is a flow chart showing operation of performing a watchdog timer check (1560) of FIG. 15, according to disclosed embodiments. As shown in FIG. 19, the operation begins by receiving both a first watchdog timer signals from a first division 110 and a second watchdog timer signal from a second division 115 (1910).

The system then determines whether the first watchdog timer signal and the second watchdog timer signal are both de-energized, i.e. whether they both indicate that the undervoltage coil should be de-energized (1920).

If one or both of the first watchdog timer signal and the second watchdog timer signal are not de-energized, then processing continues without any further action being taken.

If, however both the first watchdog timer signal and the second watchdog timer signal are de-energized, then the system de-energizes the undervoltage coil, opening the RTB and starting shutdown of the nuclear reactor (1930). Processing then ends (1640).

CONCLUSION

In summary, for each protective action, the level 1 voting logic inherently converts from 2oo4 with no partial trip signal failures to 2oo3, then to 2oo2 as partial trip signal failures associated with that function increase. Partial trip signal failures can occur due to measurement channel failures or due to an inability to receive the partial trip signals from the other division due to a data link failure.

Either division 110, 115 can accomplish the needed protective action by itself, because the level 2 protective action safety demand voting is 1oo2. Therefore, the 2oo2 and 1oo1 level 1 voting states within either safety division still allow the system to meet the single failure requirement, as long as the voting can be satisfied based on measurement channels from within each respective safety division. In other words, if either safety division can still provide a protective action safety demand based only on the measurement channel(s) from within its own division, then the protective action can be accomplished with single failure criterion compliance.

The enhanced voting logic in each safety division allows the plant operator to initiate reconfiguration of the level 1 voting logic to keep the system within single failure criterion compliance for any measurement channel or data link failure, and thereby clear any LCO conditions. While this reconfiguration could be automated, manual reconfiguration gives plants the ability to restore inoperable equipment before the reconfiguration puts the plant in a state that may be more susceptible to spurious actuations should an additional failure occur.

The parallel diverse signal processing in each division with the outputs combined using 2oo2 logic reduces the potential for spurious actuation from a single safety division. This potential is further reduced through an energize-to-actuate RT design that complies with the fail-safe criterion of GDC 23 through a unique configuration of watchdog timers.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of generating a safety demand signal for a nuclear power plant, the method comprising
   receiving a plurality of first sensor signals and a plurality of second sensor signals at a first division;
   receiving a plurality of third sensor signals and a plurality of fourth sensor signals at a second division;
   generating first and second data signals based on the first and second sensor signals respectively;
   generating third and fourth data signals based on the third and fourth sensor signals respectively;
   sending the first and second data signals from the first division to the second division;
   sending the third and fourth data signals from the second division to the first division;
   determining that one of the first or second sensor signals is erroneous;
   determining that one of the third or fourth sensor signals is erroneous;
   entering a limiting condition of operation to accommodate a single failure criterion non-compliant condition;
   changing voting logic in the first division based on the determining that either one of the first or second sensor signals is erroneous;
   generating a first intermediate safety demand based on the changed voting logic in the first division and at least two of the first, second, third, and fourth data signals or one of the first or second data signals;
   generating a second intermediate safety demand based on the changed voting logic in the first division and at least two of the first, second, third, and fourth data signals or one of the first or second data signals;
   generating a first final safety demand based on the first intermediate safety demand and the second intermediate safety demand; and
   ending the limiting condition of operation when single failure criterion compliance is restored,
   wherein
   the first final safety demand indicates that a reactor trip or engineered safety features actuation is necessary only if both the first intermediate safety demand and the second intermediate safety demand indicate that a reactor trip or engineered safety feature actuation is necessary, and
   the plurality of first sensor signals, the plurality of second sensor signals, the plurality of third sensor signals, and the plurality of fourth sensor signals all measure the same system parameter.

2. The method of claim 1, wherein
the changed voting logic is two-out-of four voting with respect to the first, second, third, and fourth data signals, or one-out-of-two voting with respect to the first or second data signals when there is a signal failure that puts the plant in a single failure criterion non-compliant configuration.

3. The method of claim 1, wherein
the changed voting logic is A-out-of-B voting with respect to the first, second, third, and fourth data signals, or C-out-of-D voting with respect to the first or second data signals,
B is a total number of available data signals from among the first, second, third, and fourth calculation result signals, and
A is an integer equal to or lower than B,
D is a total number of available data signals from among the signals originating within the same division, and
C is an integer equal to or lower than D.

4. The method of claim 1, further comprising
changing voting logic in the second division based on the determining that either one of the third or fourth sensor signals is erroneous;
generating a third intermediate safety demand based on the changed voting logic in the second division and at least two of the first, second, third, and fourth data signals or one of the third or fourth data signals;
generating a fourth intermediate safety demand based on the changed voting logic in the second division and at least two of the first, second, third, and fourth data signals or one of the third or fourth data signals; and
generating a second final safety demand based on the third intermediate safety demand and the fourth intermediate safety demand; and
generating a reactor trip or engineered safety features actuation by using one-out-of-two voting based on the first and second final safety demands from the first and second divisions, respectively.

5. The method of claim 1, wherein
the generating of the first intermediate safety demand is performed by using one-out-of-two voting between a first result of one-out-of-one voting based on one of the first and second data signals and a second result based on two-out-of-three voting with respect to three of the first, second, third, and fourth data signals.

6. The method of claim 1, wherein
the generating of the first intermediate safety demand is performed by using one-out-of-two voting between a first result of one-out-of-one voting based on one of the first and second data signals and a second result of two-out-of-two voting with respect to two of the first, second, third, and fourth data signals.

7. The method of claim 1, wherein
the generating of the first intermediate safety demand is performed in the first division,
the generating of the second intermediate safety demand is performed in the first division,
the first intermediate safety demand and the second intermediate safety demand are combined in subsequent two-out-of-two logic in the first division to generate a first final reactor trip or engineered safety features actuation demand, and
the first intermediate safety demand and second intermediate safety demand use logic that resides in different reactor protection processor memory locations.

8. The method of claim 1, further comprising
delaying the first intermediate safety demand by a first delay amount prior to generating the first final reactor trip or engineered safety features actuation demand; and
delaying the second intermediate safety demand by a second delay amount prior to generating the first final reactor trip or engineered safety features actuation demand.

9. The method of claim 1, further comprising:
energizing an energize-to-actuate shunt trip coil to activate a reactor trip breaker based at least in part on the first final reactor trip or engineered safety features actuation demand.

10. The method of claim 1, further comprising:
energizing the shunt trip coil and de-energizing an undervoltage coil to actuate a reactor trip breaker in the first division based on an energize-to-actuate final safety demand from the safety division.

11. The method of claim 10, further comprising:
providing a first watch-dog-timer in the first division, which de-energizes when a first reactor protection processor failure or first loss of power is detected within the first division,
providing a second watch-dog-timer in the second division, which de-energizes when a second reactor protection processor failure or a second loss of power is detected within the second division,
configuring the first and second watch-dog-timers so that they de-energize first and second undervoltage coils in first and second reactor trip breakers when both the first and second watch-dog-timers detect a reactor protection processor failure or loss of power.

12. The method of claim 1, further comprising:
providing a first watch-dog-timer output at a first division reactor protection processor, the first watch-dog-timer being associated with the first division and indicating whether or not a reactor trip is required;
de-energizing a de-energize-to-activate undervoltage coil to activate a reactor trip breaker based at least in part on an output of the first watch-dog-timer output.

13. The method of claim 1, further comprising:
changing voting logic in the second division based on the determining that either one of the third or fourth sensor signals is erroneous;
generating a third intermediate safety demand based on the changed voting logic in the second division and at least two of the first, second, third, and fourth data signals or one of the third or fourth data signals;
generating a fourth intermediate safety demand based on the changed voting logic in the second division and at least two of the first, second, third, and fourth data signals or one of the third or fourth data signals;
generating a second final safety demand based on the third intermediate safety demand and the fourth intermediate safety demand,
wherein the second final safety demand indicates that a reactor trip or engineered safety features actuation is necessary only if both the third intermediate safety demand and the fourth intermediate safety demand indicate that a reactor trip or engineered safety features actuation is necessary.

14. The method of claim 1, wherein
the method does not employ any other divisions than the first and second divisions in determining whether a reactor trip is necessary.

15. The method of claim 1, wherein
the first division includes a first reactor trip breaker and a second reactor trip breaker, and
the first reactor trip breaker is in parallel with the second reactor trip breaker,
further comprising
generating a first reactor trip initiation signal by the first division when both the first and second reactor trip breakers are activated.

16. The method of claim 15, wherein
the second division includes a third reactor trip breaker and a fourth reactor trip breaker, and
the third reactor trip breaker is in parallel with the fourth reactor trip breaker,
further comprising
generating a second reactor trip initiation signal by the second division when both the third and fourth reactor trip breakers are activated.

17. The method of claim 16, further comprising
initiating a reactor trip or engineered safety feature actuation when either the first reactor trip initiation signal is generated or the second reactor trip initiation signal is generated.

* * * * *